(12) United States Patent
Kaneeda et al.

(10) Patent No.: US 7,696,686 B2
(45) Date of Patent: Apr. 13, 2010

(54) IMAGE DISPLAY DEVICE AND PROCESS OF MANUFACTURE

(75) Inventors: Masato Kaneeda, Hitachinaka (JP); Yoshiyuki Kaneko, Hachioji (JP); Tsutomu Kuniyasu, Mobara (JP); Yuuichi Kijima, Chosei (JP); Kenji Kato, Mobara (JP); Toshiaki Kusunoki, Tokorozawa (JP)

(73) Assignee: Hitachi Displays, Ltd. (JP)

( * ) Notice: Subject to any disclaimer, the term of this patent is extended or adjusted under 35 U.S.C. 154(b) by 272 days.

(21) Appl. No.: 11/959,565

(22) Filed: Dec. 19, 2007

(65) Prior Publication Data
US 2008/0150415 A1 Jun. 26, 2008

(30) Foreign Application Priority Data
Dec. 22, 2006 (JP) .............................. 2006-346569

(51) Int. Cl.
*H01J 1/62* (2006.01)
(52) U.S. Cl. ........................................ 313/503; 313/506
(58) Field of Classification Search ................ 313/498, 313/503, 506
See application file for complete search history.

(56) References Cited

U.S. PATENT DOCUMENTS

| | | | | |
|---|---|---|---|---|
| 4,874,985 A | * | 10/1989 | Hase et al. | .................. 313/487 |
| 5,747,929 A | * | 5/1998 | Kato et al. | .................. 313/503 |
| 2004/0124761 A1 | | 7/2004 | Kusunoki et al. | |
| 2006/0267480 A1 | | 11/2006 | Kusunoki et al. | |

FOREIGN PATENT DOCUMENTS

| | | |
|---|---|---|
| JP | 07-065710 | 3/1995 |
| JP | 10-153979 | 6/1998 |
| JP | 2007-019038 | 2/2007 |

OTHER PUBLICATIONS

K. Kuniyoshi, et al., "Emission Charateristics of Metal-Oxide-Semiconductor Electron Tunneling Cathode", J. Vac. Sci. Technol. B11 (2), pp. 429-432 (1993).
N. Negishi, et al., "High Efficiency Electron-Emission in $Pt/SiO_x/Si/Al$ Structure", Jpn. J. Appl. Phys. vol. 36, (1997), pp. 939-941.
Applied Physics, vol. 63, No. 6, 1994, pp. 592-595.
Applied Physics, vol. 66, No. 5, 1997, pp. 437-443.

* cited by examiner

*Primary Examiner*—Vip Patel
(74) *Attorney, Agent, or Firm*—Antonelli, Terry, Stout & Kraus, LLP.

(57) ABSTRACT

To provide an image display device including a lower electrode, an upper electrode, and an electron acceleration layer composed of an insulator or a semiconductor provided there between, and further including a thin film electron source array that emits electrons from the upper electrode, and a phosphor surface, wherein degradation of an electron emission characteristic caused by an increase of a work function due to an adhesive material to the above-described upper electrode is suppressed. An amount of S content adhering to the upper electrode is set equal to or less than 20 mol % of a total amount of elements used as the upper electrode in terms of elements by using an element belonging to Group VIII or Group Ib or a laminated film or alloy film thereof as a component of the upper electrode of the thin film electron source.

11 Claims, 18 Drawing Sheets

A-A' CROSS SECTION

B-B' CROSS SECTION

A-A' CROSS SECTION

B-B' CROSS SECTION

A-A' CROSS SECTION

B-B' CROSS SECTION

A-A' CROSS SECTION

B-B' CROSS SECTION

A-A' CROSS SECTION

B-B' CROSS SECTION

A-A' CROSS SECTION

B-B' CROSS SECTION

IMAGE DISPLAY DEVICE AND PROCESS OF MANUFACTURE

FIELD OF THE INVENTION

The present invention relates to image display devices, and is specifically suitable for an image display device using thin film electron sources that is also called a self-luminous type flat panel display.

BACKGROUND OF THE INVENTION

As one of the self-luminous type flat panel displays (FPD), an image display device using an extremely small and integratable cold cathode type thin film electron source (field emission display: FED) has been developed. The thin film electron sources of this type of image display device are classified into a field emission type electron source and a hot electron type electron source. The former includes a spindt type electron source, a surface conduction type electron source, and a carbon nano-tube type electron source, while the latter includes thin film electron sources of an MIM (Metal-Insulator-Metal) type formed by laminating a metal layer, an insulator layer, and a metal layer, an MIS (Metal-Insulator-Semiconductor) type formed by laminating a metal layer, an insulator layer, and a semiconductor layer, an Metal-Insulator-Semiconductor-Metal type, and the like.

The MIM type thin film electron source is described, for example, in Patent Documents 1 to 3, and as for the Metal-Insulator-Semiconductor type, an MOS type is described in non-Patent Document 1, and as for the Metal-Insulator-Semiconductor-Metal type, a HEED type is described in non-Patent Document 2, and the like. Moreover, an EL type is described in non-Patent Document 3 and the like, and a porous silicon type is described in non-Patent Document 4 and the like.

(Patent Document 1) JP-A-7-65710
(Patent Document 2) JP-A-10-153979
(Patent Document 3) JP-A-2007-19038
(Non-Patent Document 1) J. Vac. Sci. Technol. B11 (2), pp. 429-432 (1993)
(Non-Patent Document 2) Jpn. J. Appl. Phys. vol. 36, (1997), pp. 939-941
(Non-Patent Document 3) Applied Physics, vol. 63, No. 6, 1994, pp. 592-595
(Non-Patent Document 4) Applied Physics, vol. 66, No. 5, 1997, pp. 437-443

BRIEF SUMMARY OF THE INVENTION

Such a thin film electron source is arranged in a plurality of lines (e.g., in horizontal direction) and in a plurality of rows (e.g., in vertical direction) to form a two-dimensional matrix, and a large number of phosphors are arranged on a phosphor surface in vacuum corresponding to each thin film electron source, whereby an image display device may comprise the above-described matrix of thin film electron sources and the phosphor surface. Especially, the hot electron type thin film including a lower electrode, an upper electrode, and an electron acceleration layer provided therebetween has a simple device structure as compared with the field emission type electron source, and is thus expected to be applied to display devices.

An image display device may be configured by arranging such a thin film electron source in a plurality of lines (e.g., in horizontal direction) and in a plurality of rows (e.g., in vertical direction) and forming a two-dimensional matrix, and then by arranging a large number of phosphors corresponding to each thin film electron source in vacuum. However, because such a cold cathode type thin film electron source is operated at low temperature as compared with the hot cathode type one, the surface of an electron emission part is likely to be affected by contamination such as gas adsorption.

In preparing the electron source array, although the resist process, peeling process, etching process, and the like are commonly used, if S, Cl, F, N contents, a carbon content, and the like are contained in the gases, liquids and solutions, and the like that are used in these processes, these contents may adhere to an electron emission surface. In this case, this adhesion interferes with the electron emission from the upper electrode to the phosphor, thus causing problems such as the decreased brightness of an image.

Furthermore, in a glass sealing process for bonding the electron source array and the phosphor surface substrate together, organic compounds, such as a binder and a solvent, used within the paste of a frit glass, the phosphor surface, and the like may be burnt and scattered and adsorbed to the electron emission part, thus preventing the electron emission from being obtained.

In order to solve this problem, the electron emission surface needs to be prevented from being contaminated with the adhesion of S (sulfur) content, Cl (chlorine) content, F (fluorine) content, N (nitrogen) content, or C (carbon) content, or with $NH_3$ and amines, NOx, CH, an alkali metal, an alkali metal compound, an alkaline earth metal, an alkaline earth metal compound, and the like.

Thus, it is an object of the present invention to provide an image display device including a thin film electron source that facilitates hot electron emission from an upper electrode by suppressing contamination caused by these adhesive materials, and a process of manufacturing the same.

An image display device of the present invention comprises a lower electrode, an upper electrode, and an electron acceleration layer (so-called a tunnel layer) composed of an insulator or a semiconductor provided therebetween, and further comprises a thin film electron source array (two-dimensional matrix array) for emitting electrons from the upper electrode, and a phosphor surface. Then, as the formation material of the upper electrode, an element belonging to Group VIII or Group Ib of the periodic table or a laminated film or alloy film thereof is used, and a work function of the surface is set equal to or less than 4.30 eV.

The electron emission characteristic of a cold cathode type thin film electron source is affected by the work function of the surface of the upper electrode. The lower the work function, the higher current density can be drawn. On the other hand, the S element has a high electronegativity of 2.5 (Chemicals Handbook, Basic Edition II, edited by Chemical Society of Japan, Maruzen), and when a sulfur (S) content adheres to the upper electrode, the S element may reduce the work function of the upper electrode, thus degrading the electron emission characteristic of the electron source. In the present invention, in order to set the work function of the surface equal to or less than 4.30 eV, the amount of S content adhering to the upper electrode is set equal to or less than 20 mol % of a total amount of elements used as the upper electrode in terms of elements.

The adhering S content may be S, $SO_2$, $SO_3$, $SO_4$, $H_2S$, or the like. When an element belonging to Group VIII, e.g., platinum (Pt) or the like, is used as the upper electrode, especially $SO_3$ and $SO_4$ are likely to adhere to Pt. thus leading to degradation of the electron emission characteristic.

The method of reducing the S content is not limited in particular as long as the amount of adhesion of the S content to the upper electrode can be reduced. The generation source of the S content may be a residual liquid of the component of a resist agent, a decomposition product of $SF_6$ during dry etching, and the like. Accordingly, measures, such as removing the residual liquid of resist or using an etching gas such as $CF_4$ that contains no $SF_6$, can reduce the amount of S content adhering to the upper electrode. Moreover, an adhered S content can be also reduced by the methods such as by heat treating while contacting the electron source array to air or $H_2$ (hydrogen gas). If the electron source array is heat treated while being contacted to $H_2$, the S content having adhered to the upper electrode may turn into a gas such as $SO_2$, $SO_3$, or $H_2S$ and be removed from the upper electrode. Moreover, the S content may adhere to the upper electrode together with carbon and hydrocarbon. In this case, by heat treating while circulating air, the carbon and hydrocarbon may turn into CO or $CO_2$ by oxygen contained in the air and be removed, so the S content may also turns into a gas such as $SO_2$ or $SO_3$ and be removed simultaneously. In this case, the heat treatment temperature is preferably set equal to or greater than 200° C., and is further preferably if set equal to or greater than 350° C. This may be because if the heat treatment temperature is equal to or greater than 350° C., $H_2$ and the oxygen in air easily reacts with the S content, carbon, and hydrocarbon. The upper limit temperature is limited to the value equal to or less than a melting temperature of the upper electrode.

The amount of S content adhering to the upper electrode is more preferably equal to or less than 10 mol % of a total amount of elements used as the upper electrode in terms of elements. If the amount of S content is set equal to or less than 10 mol %, the fluctuation of the work function with respect to the amount of adhesion of S content becomes small, thus allowing the work function to be kept low.

Moreover, the S content may not be completely removed from the upper electrode for reasons such as having to use $SF_6$ in order to increase the etching rate, for example. In that case, even if the amount of S content adhering to the upper electrode is equal to or greater than 0.1 mol % of a total amount of elements used as the upper electrode in terms of elements, no serious problem will occur. In other words, if the amount of S content adhering to the upper electrode is in a range from 0.1 mol % to 10 mol % of a total amount of elements used as the upper electrode in terms of elements, the work function of the upper electrode is low and thus a high current density can be drawn.

In addition to the amount of adhesion of S content, it is more preferable if the amount of chlorine (Cl) content adhering to the upper electrode is equal to or less than 10 mol % of a total amount of elements used as the upper electrode in terms of elements. As in the S element, the Cl element has a high electronegativity of 3.0 (Chemicals Handbook, Basic Edition II, edited by Chemical Society of Japan, Maruzen), and thus if a Cl content adheres to the upper electrode, it will reduce the work function of the upper electrode, thus degrading the electron emission characteristic of the electron source. The adhering Cl content may be HCl, $Cl_2$, or the like. HCl and $Cl_2$ are likely to adhere to the upper electrode when an element belonging to Group VIII is used as the upper electrode, thus leading to degradation of the electron emission characteristic.

Because HCl in particular is a highly corrosive gas, it may couple with a glass composition to form a chloride and this chloride may evaporate to adhere to the upper electrode or a wiring part. The method of reducing the Cl content is not limited in particular as long as the amount of adhesion of the Cl content to the upper electrode can be reduced. For example, the adhered Cl content can be reduced by a method such as by heat treating while contacting the electron source array to air or hydrogen gas ($H_2$).

Moreover, it is more preferable if the amount of fluorine (F) content adhering to the upper electrode is equal to or less than 3 mol % of a total amount of elements used as the upper electrode in terms of elements. As in the S element and Cl element, the F element also has a high electronegativity of 4.0 (Chemicals Handbook, Basic Edition II, edited by Chemical Society of Japan, Maruzen), and thus if an F content adheres to the upper electrode, it will reduce the work function of the upper electrode, thus degrading the electron emission characteristic of the electron source. The adhering F content may be $CF_4$, $SF_6$, $SOF_2$, or the like. The source of F may be a residual liquid of $SF_6$, $CF_4$, or the like used during dry etching. The adhered F content can be reduced by a method such as by reducing the usage of these etching gases or by heat treating while contacting the electron source array to air or $H_2$.

Moreover, it is more preferable if a total amount of $NH_3$ and amines adhering to the upper electrode is equal to or less than 30 mol % of a total amount of elements used as the upper electrode based in terms of nitrogen elements. As compared with the S, Cl, or F content, $NH_3$ or amines has less influence on the degradation of the work function of the surface of the upper electrode. However, $NH_3$ or amines is likely to adhere to an element belonging to Group VIII or Group Ib used as the upper electrode. For this reason, $NH_3$ or amines also can cause the electron emission characteristic of the electron source to degrade. The amines include any of a primary amine ($RNH_2$, R: alkyl group), a secondary amine ($R_2NH$), and a tertiary amine ($R_3N$). Moreover, the amines include all the compounds having an amino group, such as alkylamine and arylamine.

The method of reducing $NH_3$ or amines is not limited in particular as long as the amount of adhesion to the upper electrode can be reduced. The generation source of $NH_3$ or amines includes a residue and the like of a resist peeling liquid, and the like. Accordingly, the adhesion of $NH_3$ or amines can be suppressed by thoroughly washing after peeling. Furthermore, because the adsorption power of $NH_3$ or amines to the upper electrode is weak as compared with that of S, Cl, F, and the like, the $NH_3$ or amines may be removed by a method such as by heat treating the electron source array.

Moreover, it is more preferable if a total amount of NOx adhering to the upper electrode is equal to or less than 20 mol % of a total amount of elements used as the upper electrode. If NOx adheres to an element belonging to Group VIII or Group Ib used as the upper electrode, it will reduce the work function of the surface of the upper electrode. This may cause the electron emission characteristic of the electron source to degrade. NOx includes all the compounds having an N—O bond, such as NO, $NO_2$, $N_2O$, $N_2O_3$.

The method of reducing NOx is not limited in particular as long as the amount of adhesion of NOx to the upper electrode can be reduced. The generation source of NOx may be a residual liquid of etchant, or the like. Accordingly, the adhesion of NOx can be suppressed by thoroughly washing after etching process. Moreover, the adhered S content can be also reduced by a method such as by heat treating while contacting the electron source array to air, $H_2$, and CO.

Moreover, it is more preferable if a total amount of carbon and hydrocarbon adhering to the upper electrode is equal to or less than 30 mol % of a total amount of elements used as the upper electrode in terms of carbon elements. Carbon and hydrocarbon are likely to adhere to the upper electrode when an element belonging to Group VIII is used as the upper electrode, thus possibly causing degradation of the electron emission characteristic. Hydrocarbon includes all the compounds having a C—H bond. Hydrocarbon also includes the hydrocarbon and alcohols represented by CxHy.

In the glass sealing process to bond the electron source array and the phosphor surface substrate together, organic compounds, such as a binder and a solvent, used in the paste of a frit glass, the phosphor surface, and the like, may be burnt and scattered and adsorbed to the electron emission part, thus preventing the electron emission from being obtained. Accordingly, in this case, the amount of carbon and hydrocarbon can be reduced by a method such as by heat treating while circulating $O_2$ within a panel.

The electron emission characteristic of a cold cathode type electron source is affected by the work function of the surface, and the lower the work function, the higher current density can be drawn. Accordingly, the electron emission characteristic can be improved by reducing the work function of the upper electrode. Specifically, the work function of the upper electrode can be reduced by containing an alkali metal or an alkali metal compound with a low electronegativity into the upper electrode. This approach can suppress a significant increase in the work function even if a small amount of compound containing an element, such as S, Cl, and F, with a high electronegativity adheres.

Moreover, by containing an alkali metal or alkali metal compound into the upper electrode, a diode current can start to flow at a low threshold voltage and the drive voltage can be reduced, thus leading to a reduction in power consumption and a longer life of the electron source.

As the alkali metal or the alkali metal compound, other than an elemental alkali metal, those containing an alkali metal in the form of oxide, carbonate, hydroxide, phosphate, and the like may be used. Although the possible alkali metals include Li, Na, K, Rb, Cs, and Fr, K or Cs is suitable in terms of the performance, cost, ease of handling of the raw material, and the like.

As for the method of adding an alkali metal or alkali metal compound, either of the physical preparation methods, such as a coating method, an impregnation method, and a vacuum deposition method, or the preparation method using a chemical reaction, or the like can be applied. As the starting material, various kinds of compounds, such as a nitric acid compound, an acetic acid compound, a complex compound, hydroxide, a carbonate compound, and an organic compound, or a metal and metallic compound can be used.

Moreover, the additive amount of an alkali metal or alkali metal compound is preferably set in a range from 0.5 mol % to 50 mol % to a total amount of elements belonging to Group VIII or Group Ib used in the upper electrode in terms of metal elements. In the case of 0.5 mol % or less, the effect of addition will not appear, and in the case of 50 mol % or more, the scattering of hot electrons due to the alkali metal or alkali metal compound will occur, thus degrading the electron emission characteristic.

The alkali metal earth or alkaline earth metal compound also has a low electronegativity, and thus by containing the alkali metal earth or alkaline earth metal compound into the upper electrode, the work function of the upper electrode can be reduced. As in the case of the alkali metal or alkali metal compound, this approach can suppress a significant increase in the work function even if a small amount of compound containing an element, such as S, Cl, or F, with a high electronegativity adheres.

Moreover, by containing the alkali earth metal or alkali earth metal compound into the upper electrode, the diode current can start to flow at a low threshold voltage and the drive voltage can be reduced, thus leading to a reduction in power consumption and a longer life of the electron source.

As the alkali earth metal or alkali earth metal compound, other than an elemental alkali earth metal, those containing an alkali earth metal in the form of oxide, carbonate, hydroxide, phosphate, and the like may be used. The possible alkali earth metal element may be Be, Mg, Ca, Sr, and Ba.

As for the method of adding an alkali earth metal or an alkali earth metal compound, either of the physical preparing methods, such as a coating method, an impregnation method, and a vacuum deposition method, or the preparation method using a chemical reaction, or the like can be applied. As the starting material, various kinds of compounds, such as a nitric acid compound, an acetic acid compound, a complex compound, a hydroxide, a carbonate compound, and an organic compound, and a metal and metallic compound can be used. Moreover, the additive amount of alkali earth metal or alkali earth metal compound is preferably set in a range from 0.5 mol % to 50 mol % to a total amount of elements belonging to Group VIII or Group Ib used in the upper electrode in terms of metal elements. In the case of 0.5 mol % or less, the effect of addition will not appear, and in the case of 50 mol % or more, the scattering of hot electrons due to the alkali earth metal or the alkali earth metal compound will occur, thus degrading the electron emission characteristic.

If an element of Group VIII or Group Ib used as the component of the upper electrode is caused to form an intermetallic compound, an alloy, or a complex compound, with an alkali metal or alkaline earth metal, the degradation of the electron emission characteristic of the electron source will be reduced. Although the reason for this is not clear, the formation of the above-described intermetallic compound, alloy, or complex compound might suppress the adhesion of S, Cl, F, $NH_3$, amines, NOx, carbon and hydrocarbon, and the like. In order to cause an element of Group VIII or Group Ib to form the intermetallic compound, alloy, or complex compound with an alkali metal or an alkaline earth metal, the raw material of each element, the heat treatment temperature, and the heat treating atmosphere may be changed.

If Ir, Pt, and Au are contained as the element of Group VIII or Group Ib used as the upper electrode component, the electron emission characteristic of the electron source will be improved. With regard to Au, adhesive materials are unlikely to adhere to the surface of Au, and thus the degradation of the electron emission characteristic due to the adhesive materials can be suppressed. Since Pt has a high hot-electron transmissivity, Pt has an excellent electron emission characteristic, and furthermore since Pt has a high melting point, stability to heat is also excellent. Since Ir also has a high melting point, Ir has the advantage that stability to heat is high. Accordingly, when forming the upper electrode with a laminated structure, Ir is arranged on the lowest part, on top of which Pt is arranged, and Au is arranged further on top of Pt, and thereby an electron source having a high heat resistance, wherein degradation of the electron emission characteristic due to adhesive materials is less likely to occur, can be constructed.

If the average film thickness or the average particle diameter of the upper electrode is equal to or less than 4 nm, the electron emission characteristic of the electron source will be improved. This may be because if the average film thickness or the average particle diameter of the upper electrode is equal to or greater than 4 nm, hot electrons are unlikely to pass through the upper electrode, thus degrading the electron emission characteristic.

Other objects, features and advantages of the invention will become apparent from the following description of the embodiments of the invention taken in conjunction with the accompanying drawings.

DESCRIPTION OF REFERENCE NUMERALS

10 . . . thin film electron source array substrate, 11 . . . lower electrode, 12 . . . insulating layer (tunnel insulating layer), 13 . . . upper electrode, 14 . . . protective insulating layer, 15 . . . first interlayer film, 16 . . . scanning electrode, 17 . . . contact part, 18 . . . step, 19 . . . second interlayer film, 25 . . . resist film, 30 . . . spacer, 50 . . . signal line driving circuit, 60 . . . scanning line driving circuit, 110 . . . fluorescent surface substrate, 120 . . . black matrix

DETAILED DESCRIPTION OF THE INVENTION

Hereinafter, the best mode embodiment of the present invention will be described in detail with reference to the accompanying drawings of examples. Here, an image display device using an MIM type thin film electron source will be described as an example. However, the present invention is not limited to the MIM type thin film electron source, and can be applied also to image display devices using various kinds of electron emission elements described in the paragraph of Background of the Invention.

According to the present invention, an image display device comprises a lower electrode, an upper electrode, and an electron acceleration layer composed of an insulator or semiconductor provided therebetween, and further comprises an electron source array for emitting electrons from the upper electrode, and a phosphor surface, wherein as the component of the upper electrode of this electron source array, an element belonging to Group VIII or Group Ib or a laminated film or alloy film thereof is contained. While the present invention features that the work function of the surface of the upper electrode is set equal to or less than 4.30 eV, the typical substances for decreasing the work function of the surface of the upper electrode include S, and the amount of S content is set equal to or less than 20 mol % of a total amount of elements used as the upper electrode in terms of elements. Other adhesive materials will be described one by one in paragraphs of the examples.

Figure 1:
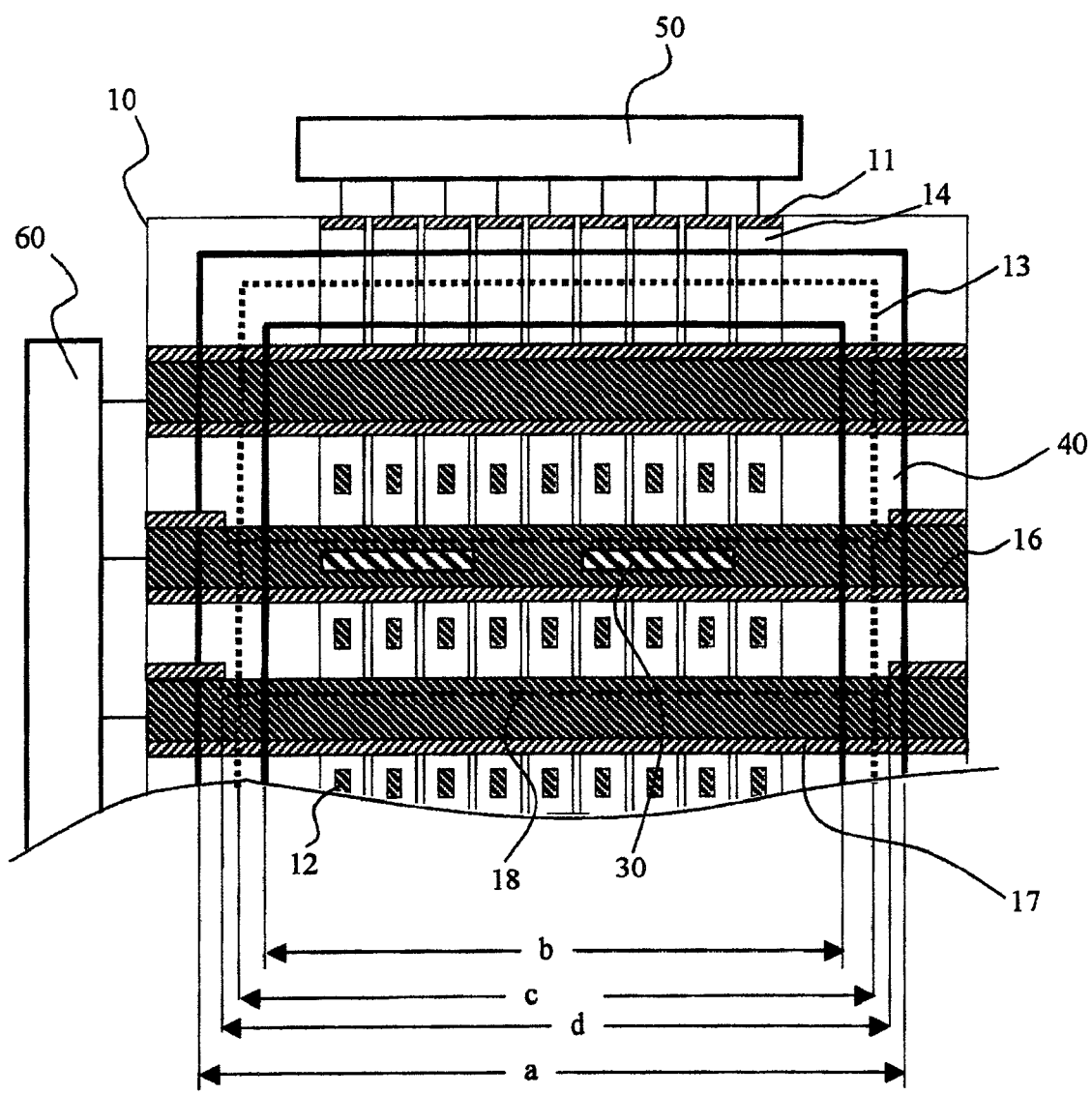
FIG. 1 is a schematic plan view of an image display device using an MIM type thin film electron source of the present invention, by way of example.

FIG. 1 is a schematic plan view illustrating an image display device concerning the present invention, taking a display device using an MIM type thin film electron source as an example. In addition, FIG. 1 shows a plane of a substrate (also called an electron source array substrate, a cathode substrate, or simply a substrate) 10 including a thin film electron source. Here, the illustration of another substrate (fluorescent substrate or anode substrate) in which a phosphor and an anode are formed is omitted.

In the electron source array substrate 10, there are formed a lower electrode 11 that constitutes a signal line (data line) coupled to a signal line driving circuit 50, an upper electrode 13 serving as an electron emission electrode, a scanning electrode (feed electrode to the upper electrode) 16 coupled to a scanning line driving circuit 60 and arranged perpendicular to the signal line, a contact part 17 for coupling the upper electrode thereto, the contact part being a part of the scanning electrode, a step structure 18 for separating the upper electrode 13 for each scanning electrode, the later-described other functional films, and the like. In addition, the thin film electron source array (electron emission part) is arranged between the scanning electrodes 16 above the lower electrode 11, and is formed with the upper electrode 13 that is deposited above the lower electrode 11 via an insulating layer 12, wherein electrons are emitted from a portion of an insulating layer (tunnel insulating layer) 12 formed with a thin layer portion, the thin layer portion being surrounded by a thick protective insulating layer (field insulating layer) 14 that limits the electron emission part.

In addition, in an inner surface of a non-illustrated phosphor surface substrate, there are formed a light shielding layer, i.e., a black matrix, for increasing the contrast of a display image, and a phosphor surface in which a plurality of colors of phosphor groups typified by a red phosphor, a green phosphor, and a blue phosphor are arranged. As the phosphor, for example, $Y_2O_2S$: Eu (P22-R) can be used for red, ZnS: CuAl (P22-G) for green, and ZnS: AgCl (P22-B) for blue. The cathode substrate 10 and the phosphor surface substrate are held at a predetermined interval by spacers 30, and a non-illustrated sealing frame is interposed therebetween on an outer periphery of a display region, and then after the sealing is carried out, the interior is vacuum sealed.

The spacers 30 are arranged above the scanning electrode 16 of the cathode substrate 10 and are arranged so as to hide under the black matrix of the phosphor surface substrate. The lower electrode 11 is coupled to the signal line driving circuit 50, and the scanning electrode 16 that is a scanning electrode wiring is coupled to the scanning line driving circuit 60. Each of the thin film electron sources, the each constituting one pixel (collar pixel) of a full color display, constitutes a unit pixel (a sub-pixel for collar display: subpixel) corresponding to each of the above-described phosphors.

Figure 2:
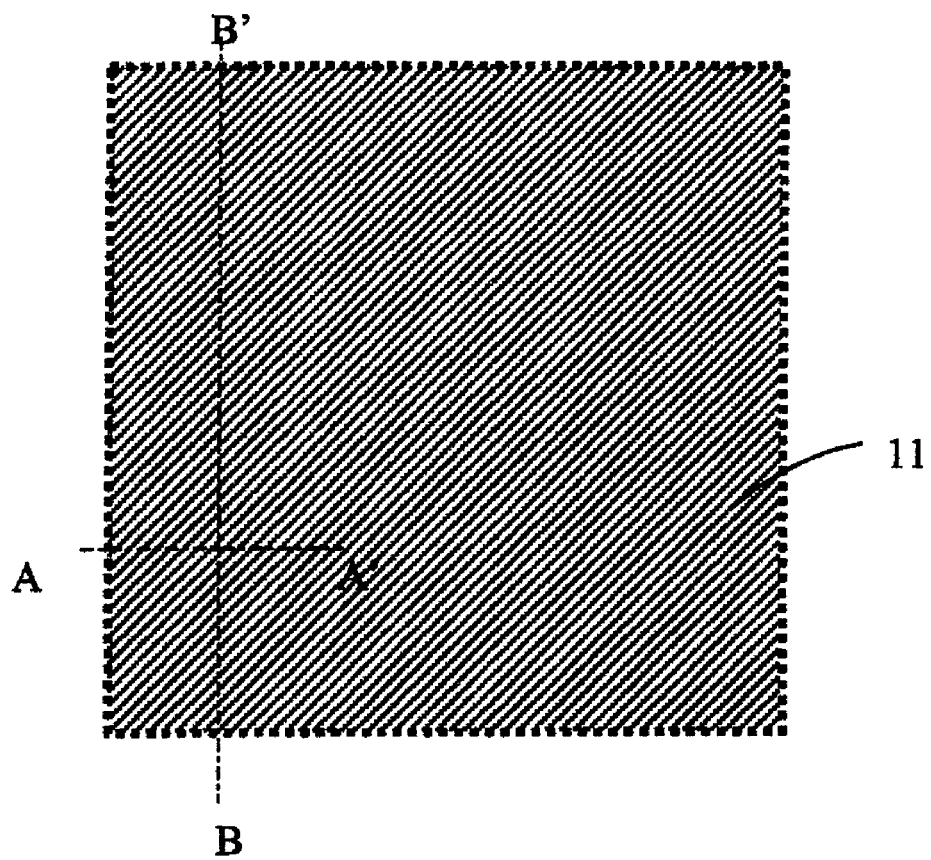
FIG. 2 is a view showing a method of manufacturing the thin film type electron source of the present invention.
Figure 2:
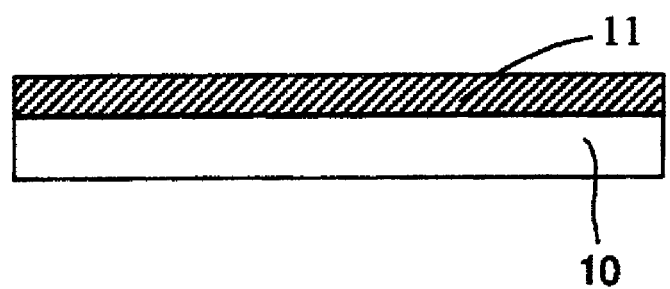
Figure 2:
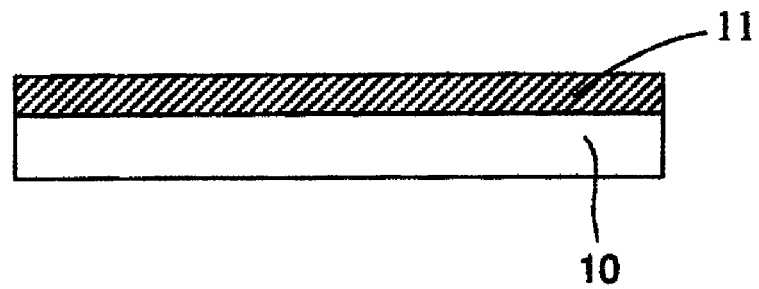

Next, an example of a method of manufacturing the thin film electron source in the cathode substrate shown in FIG. 1 will be described with reference to the accompanying drawings. FIG. 2 to FIG. 14 are plan views and cross sectional views of a principal part thereof illustrating the manufacture process of the thin film electron source constituting the cathode substrate of the image display device of the present invention. First, as shown in FIG. 2, a metal film used for the lower electrode 11 is deposited on the insulative substrate 10 such as a glass. An aluminium (Al) alloy is used as the material of the lower electrode 11. The aluminum alloy is used because an excellent quality insulating layer can be formed by anodic oxidation. Here, an Al—Nd alloy doped with 2 atomic-weight % of neodymium (Nd) was used. Sputtering is used in the deposition, for example. The film thickness was set to 600 nm.

Figure 3:
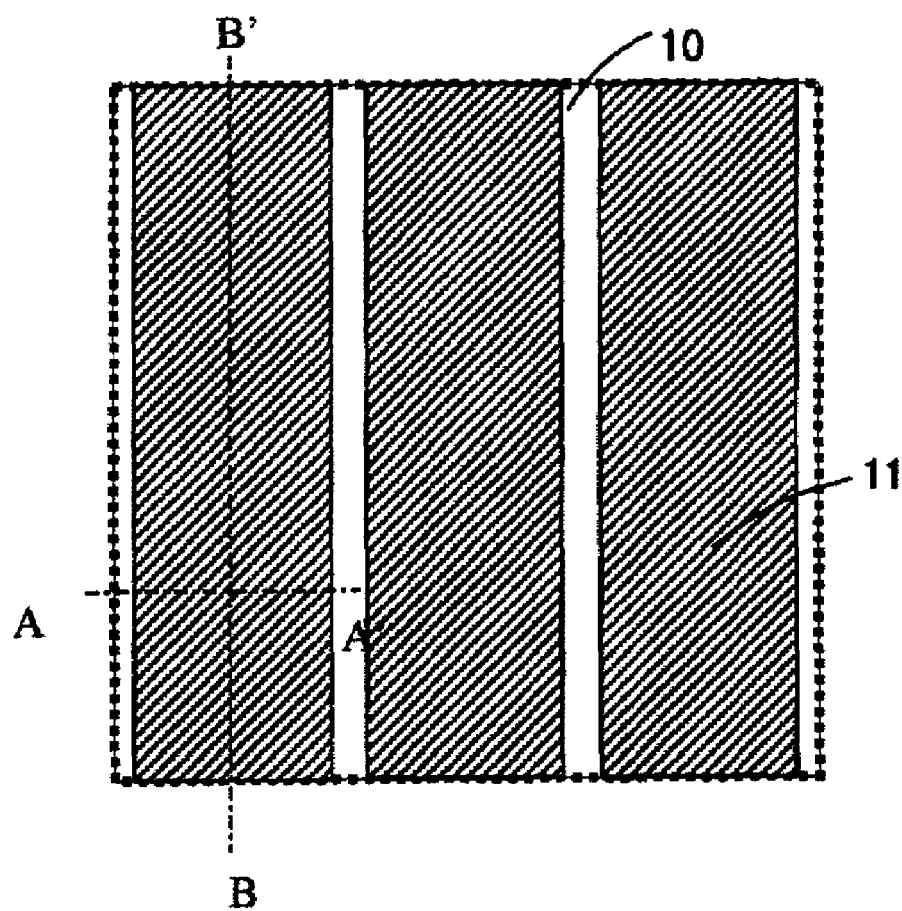
FIG. 3 is a view following FIG. 2, showing the method of manufacturing the thin film type electron source of the present invention.
Figure 3:
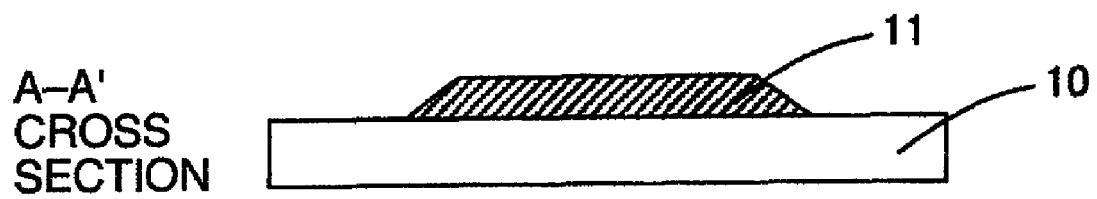
Figure 3:
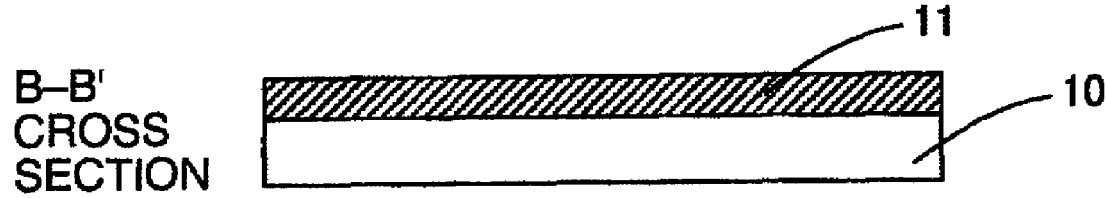

After the deposition of the metal film used for the lower electrode 11, a stripe-shaped lower electrode 11 is formed by a patterning process and an etching process (FIG. 3). Although the electrode width of the lower electrode 11 varies with the size and resolution of an image display device, the electrode width is set on the order of the pitch of the subpixel, i.e., on the order of approximately 100 μm to 200 μm. For the etching, wet etching in a mixed aqueous solution of a phosphoric acid, an acetic acid, or a nitric acid is used, for example. Since this electrode has a simple wide stripe geometry, the patterning of resist can be carried out by an inexpensive proximity exposure method, a printing method, or the like.

Figure 4:
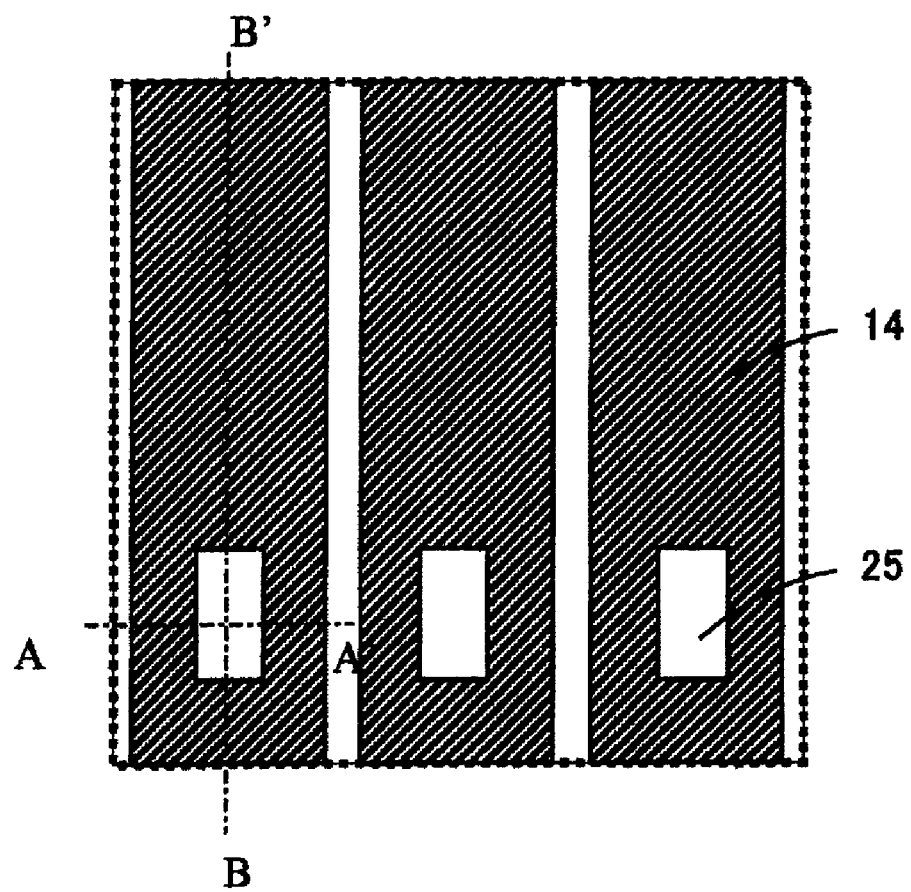
FIG. 4 is a view following FIG. 3, showing the method of manufacturing the thin film type electron source of the present invention.
Figure 4:
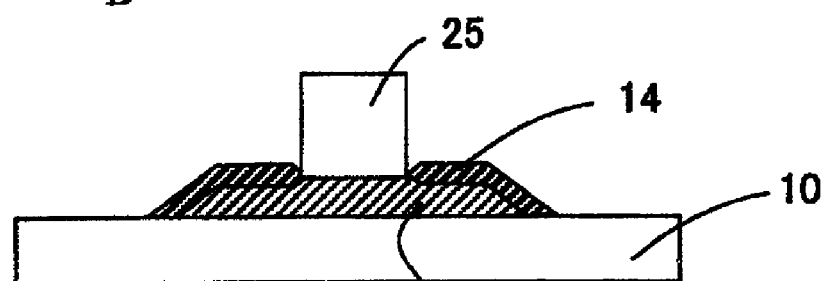
Figure 4:
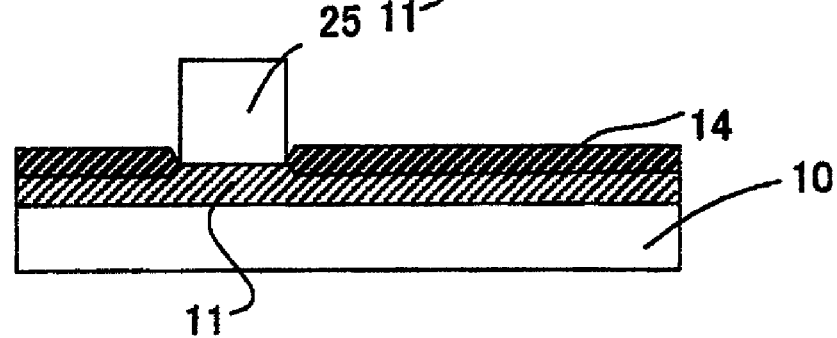
Figure 5:
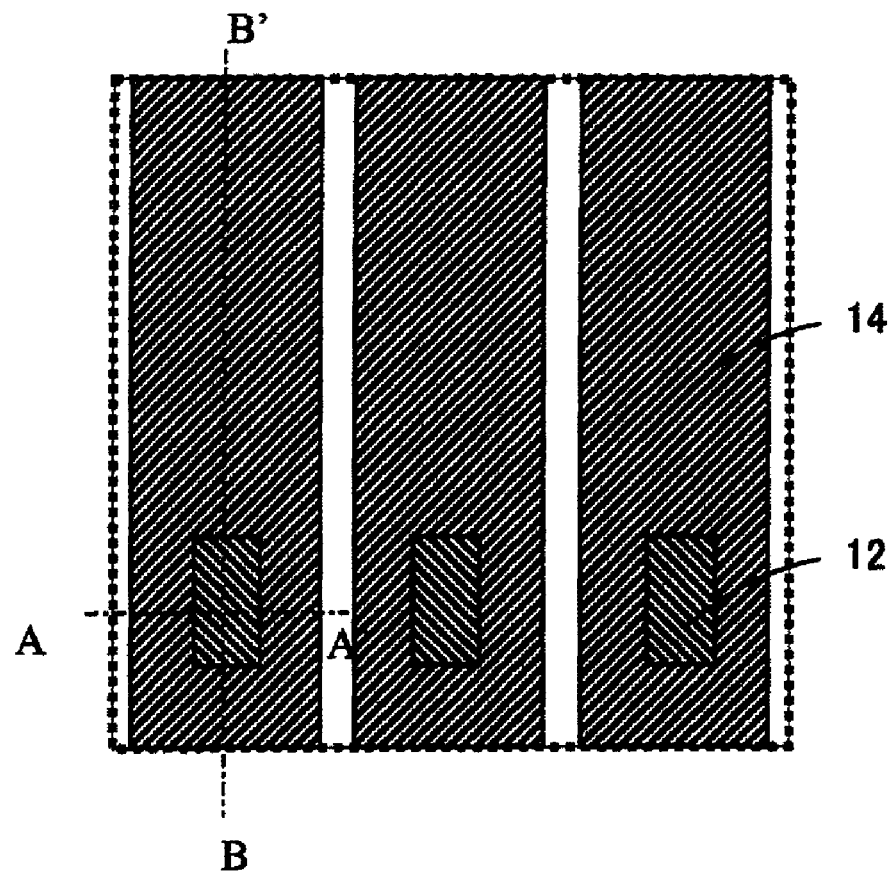
FIG. 5 is a view following FIG. 4, showing the method of manufacturing the thin film type electron source of the present invention.
Figure 5:
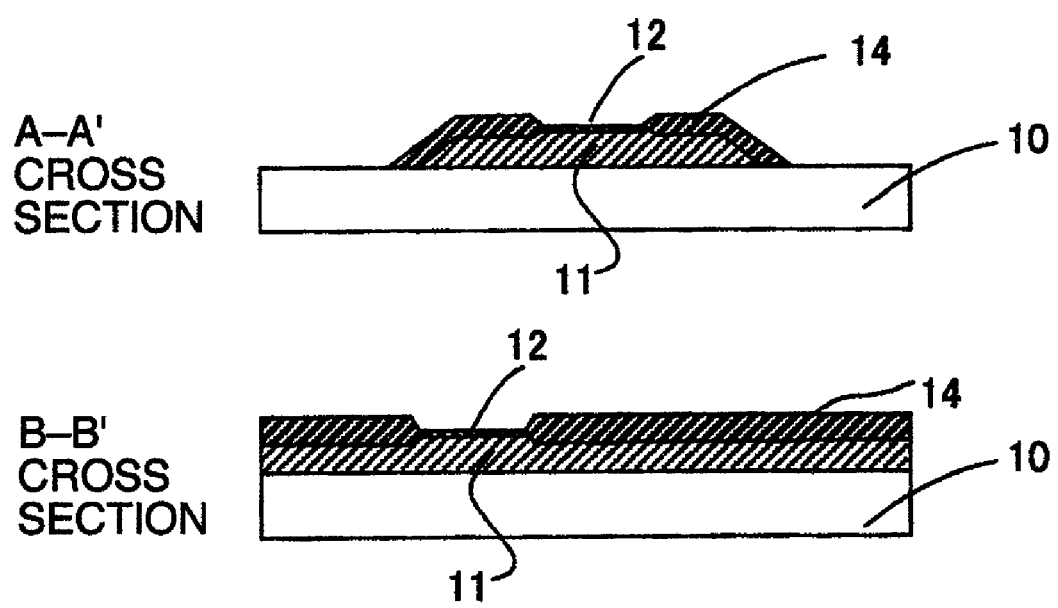

Next, a protective insulating layer 14 for limiting the electron emission part and preventing electric field concentration to an edge of the lower electrode 11, and the insulating layer 12 are formed. First, a portion above the lower electrode 11, the portion serving as the electron emission part, shown in FIG. 4, is masked with a resist film 25, and other portion is selectively thickly anodized to serve as the protective insulating layer 14. If the formation voltage is set to 200 V, the protective insulating layer 14 with a thickness of approximately 270 nm is formed. Subsequently, the resist film 25 is removed and the surface of the remaining lower electrode 11 is anodized. For example, if the formation voltage is set to 6 V, the insulating layer (tunnel insulating layer) 12 with a thickness of approximately 10 nm is formed on the lower electrode 11 (FIG. 5).

Figure 6:
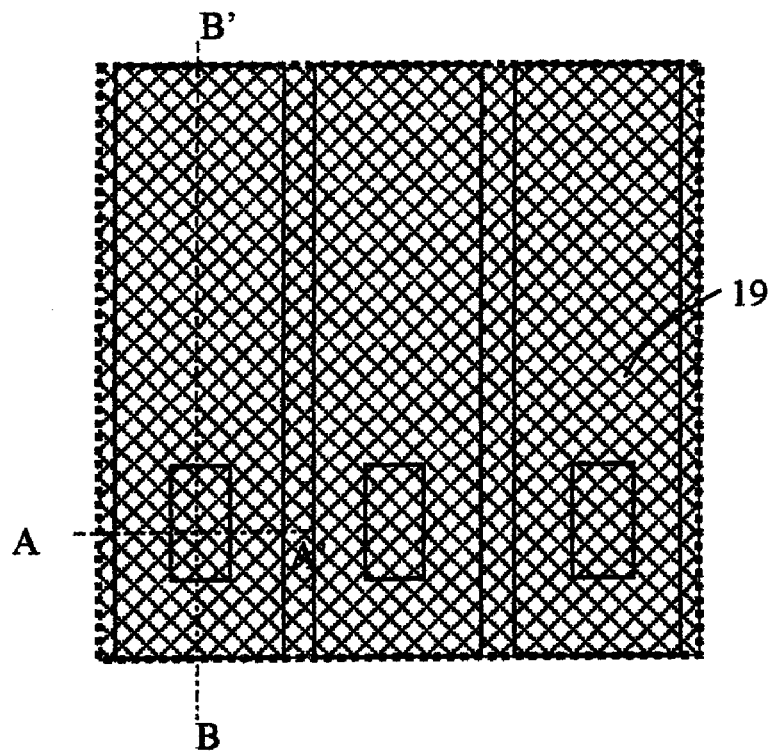
FIG. 6 is a view following FIG. 5, showing the method of manufacturing the thin film type electron source of the present invention.
Figure 6:
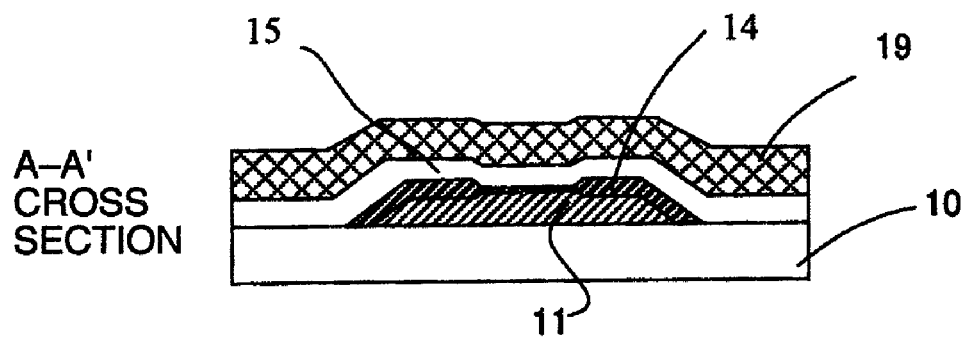
Figure 6:
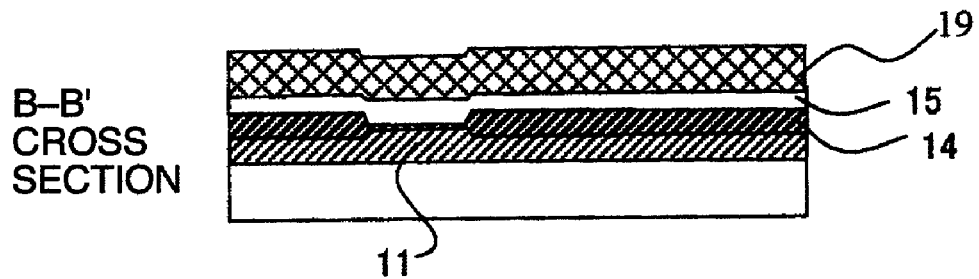
Figure 7:
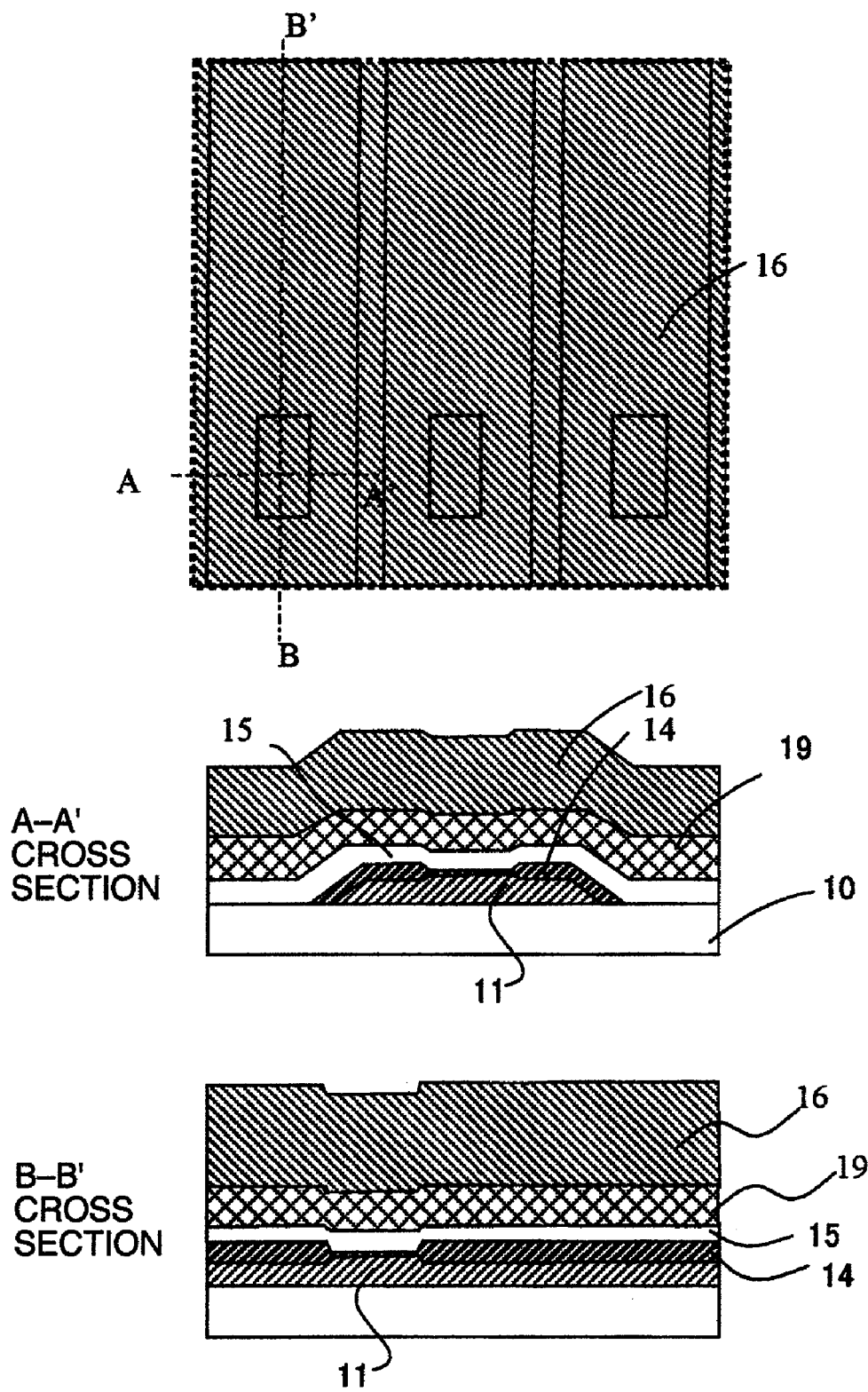
FIG. 7 is a view following FIG. 6, showing the method of manufacturing the thin film type electron source of the present invention.

Next, a first interlayer film (interlayer insulating film) 15 and a second interlayer film 19 for forming the step 18 (see FIG. 1 and the below-described FIG. 12) under the scanning electrode are sequentially deposited by sputtering (FIG. 6). As the first interlayer film 15, a silicon oxide, a silicon nitride film, or the like can be used, for example. Here, a silicon nitride film deposited in an Ar and $N_2$ atmosphere by reactive sputtering was used and the film thickness was set to 200 nm. If there is a pinhole in the protective insulating layer 14 formed by anodic oxidation, this first interlayer film 15 fills this defect, thus serving to keep insulation between the lower electrode 11 and the scanning electrode 16. As the second interlayer film 19, a material, which can be etched with a high selection ratio in dry etching using an F-based gas with respect to the first interlayer film 15, namely, silicon nitride (SiN) is used when the first interlayer film 15 is silicon oxide, for example, and silicon (Si) or the like is used when the first interlayer film 15 is silicon nitride, for example. Here, the deposition was carried out in an Ar atmosphere by sputtering using a non-doped Si target, or a Si target doped with B, P, or the like. The thickness was set to 200 nm. The Si formed by sputtering can be used as a semi-insulating material with an extremely high resistance.

Figure 8:
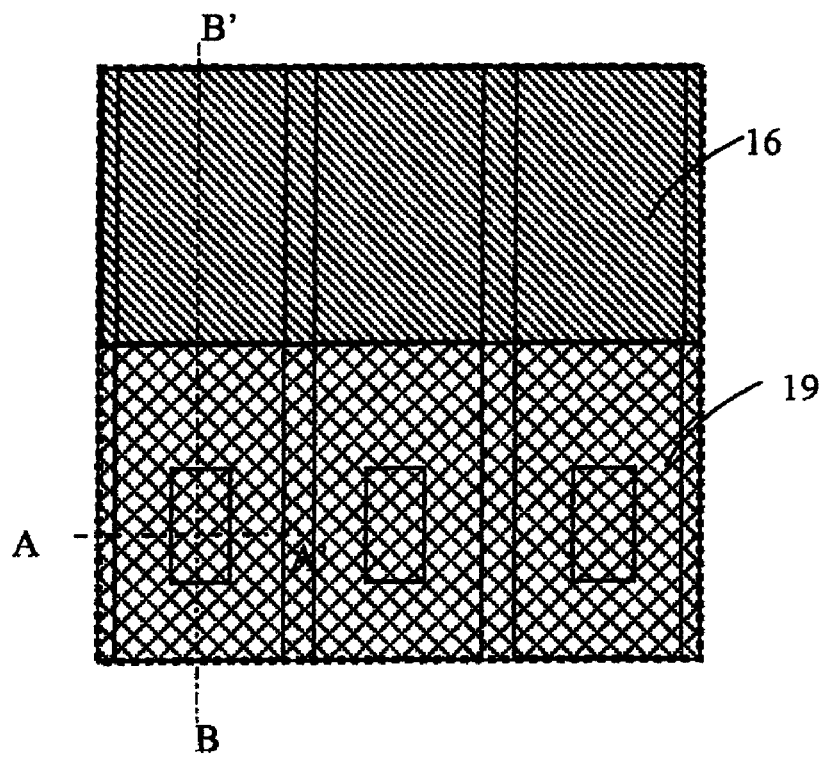
FIG. 8 is a view following FIG. 7, showing the method of manufacturing the thin film type electron source of the present invention.
Figure 8:
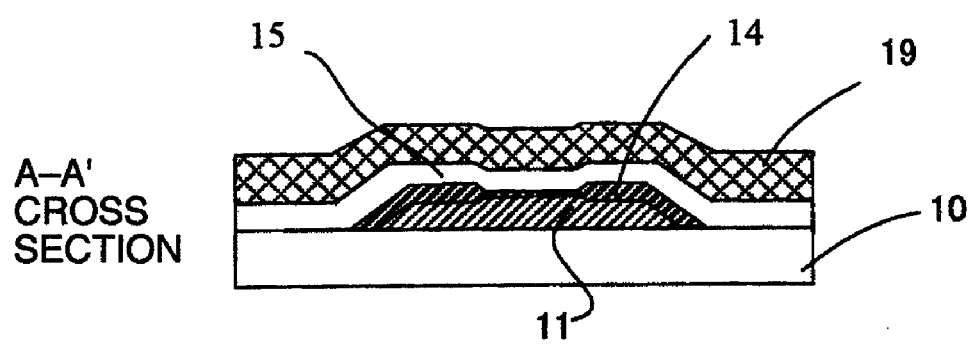
Figure 8:
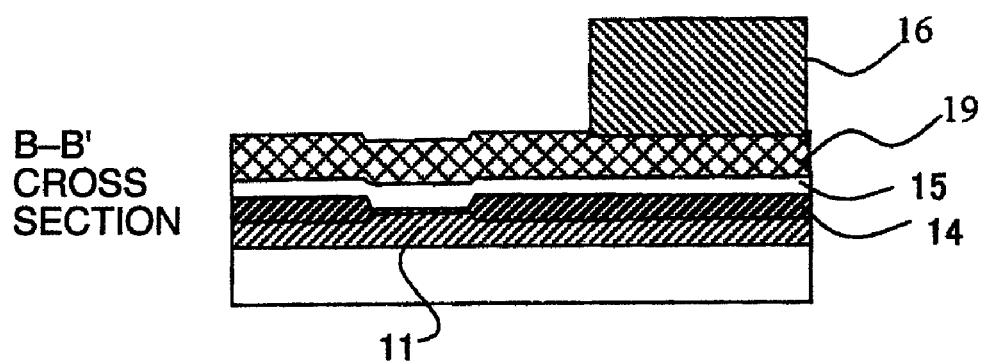

Subsequently, an Al film serving as the scanning electrode material was deposited by sputtering with a thickness of 4.5 μm (FIG. 7), and the scanning electrode 16 perpendicular to the lower electrode 11 was formed by a photoetching process. For the etching, wet etching in a mixed aqueous solution of a phosphoric acid, an acetic acid, or a nitric acid is used, for example (FIG. 8).

Figure 9:
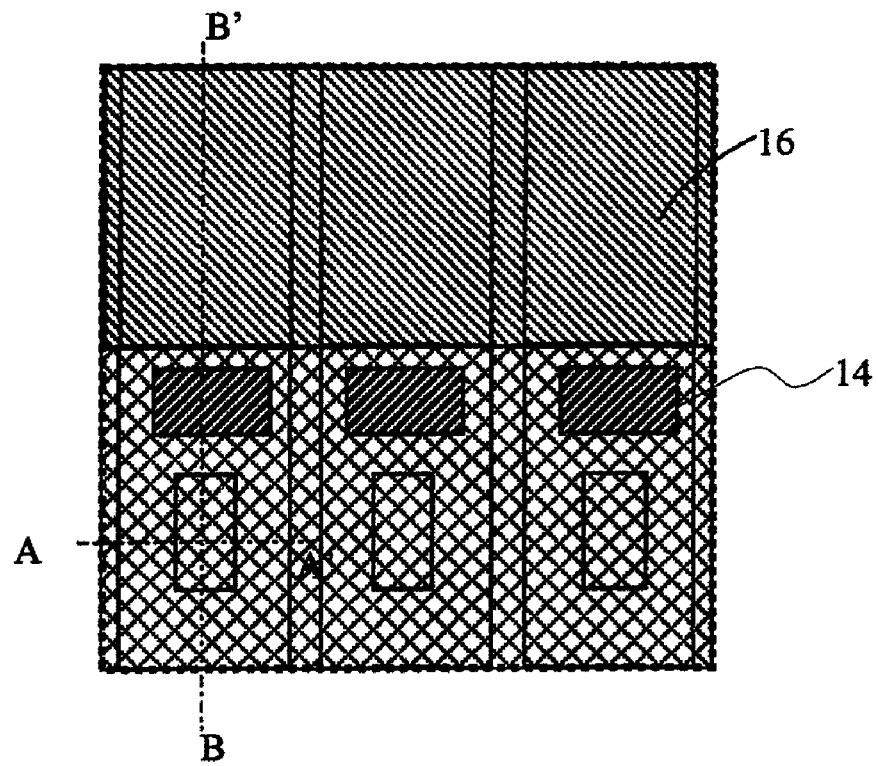
FIG. 9 is a view following FIG. 8, showing the method of manufacturing the thin film type electron source of the present invention.
Figure 9:
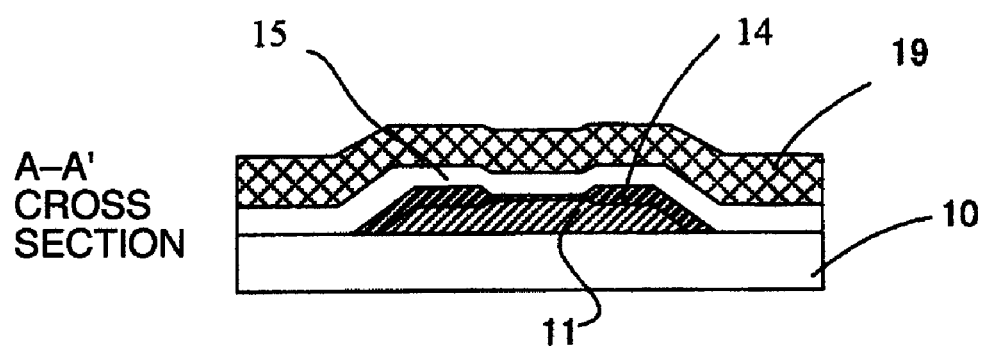
Figure 9:
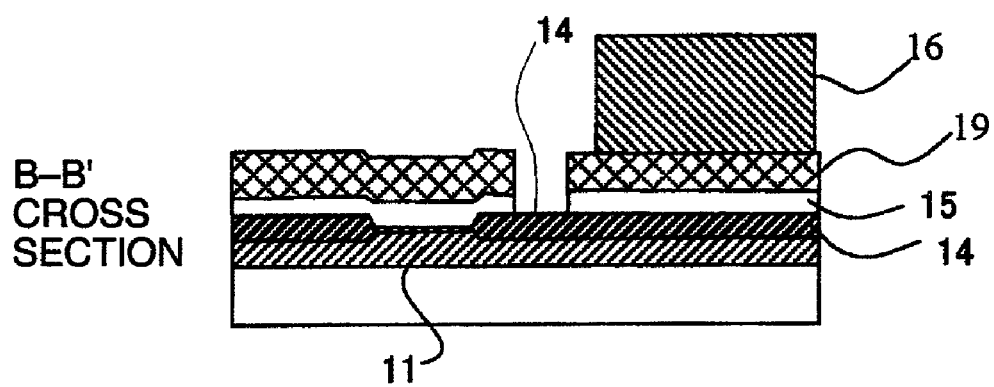
Figure 10:
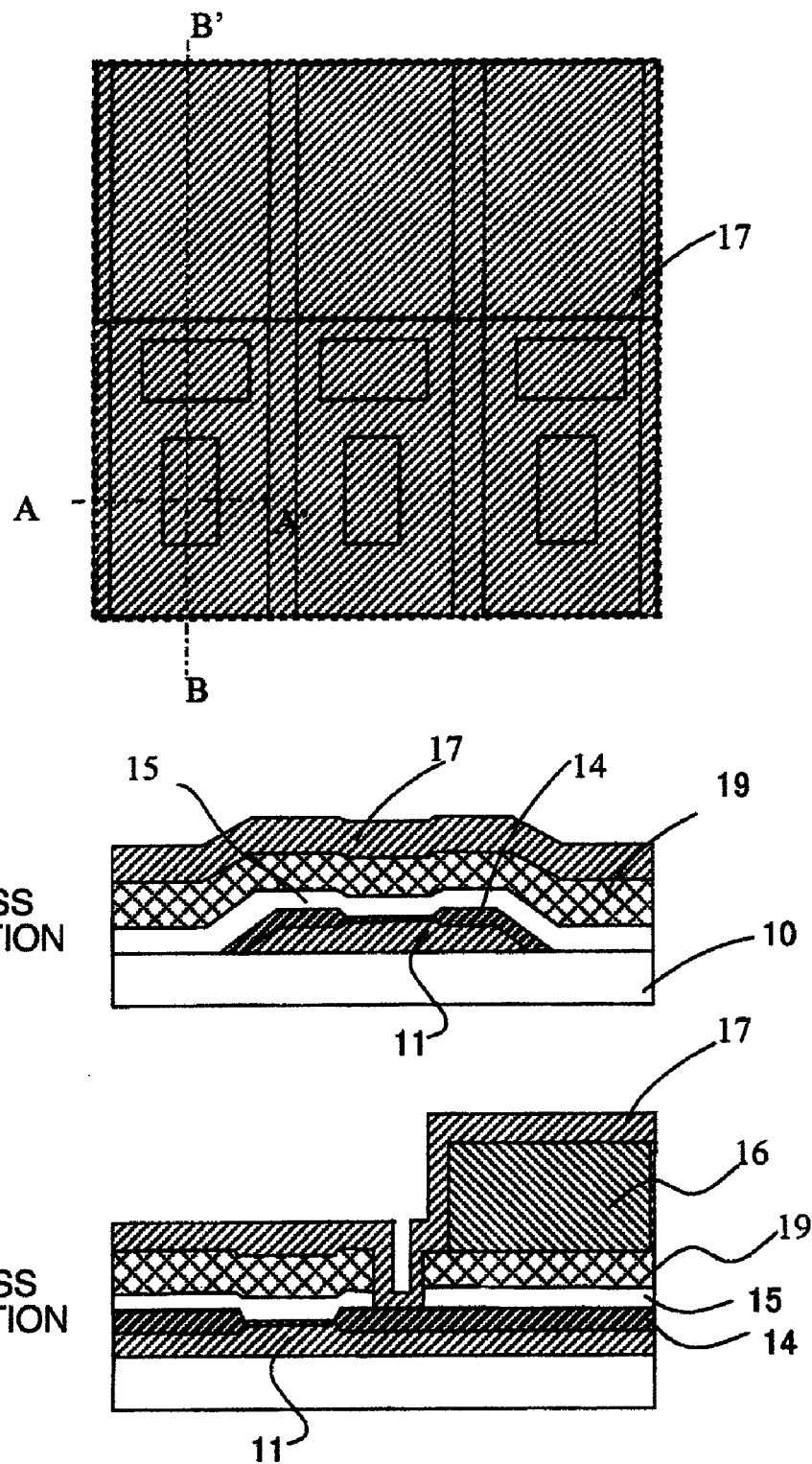
FIG. 10 is a view following FIG. 9, showing the method of manufacturing the thin film type electron source of the present invention.

Subsequently, with the use of dry etching, the second interlayer film 19 and first interlayer film 15 are selectively etched above the protective insulating film 14 to open a portion serving as an underlayer of the contact part 17 (FIG. 9). The dry etching was carried out using a mixed gas of $CF_4$ and $O_2$ or a mixed gas of $SF_6$ and $O_2$ (dry etching process A).

Figure 11:
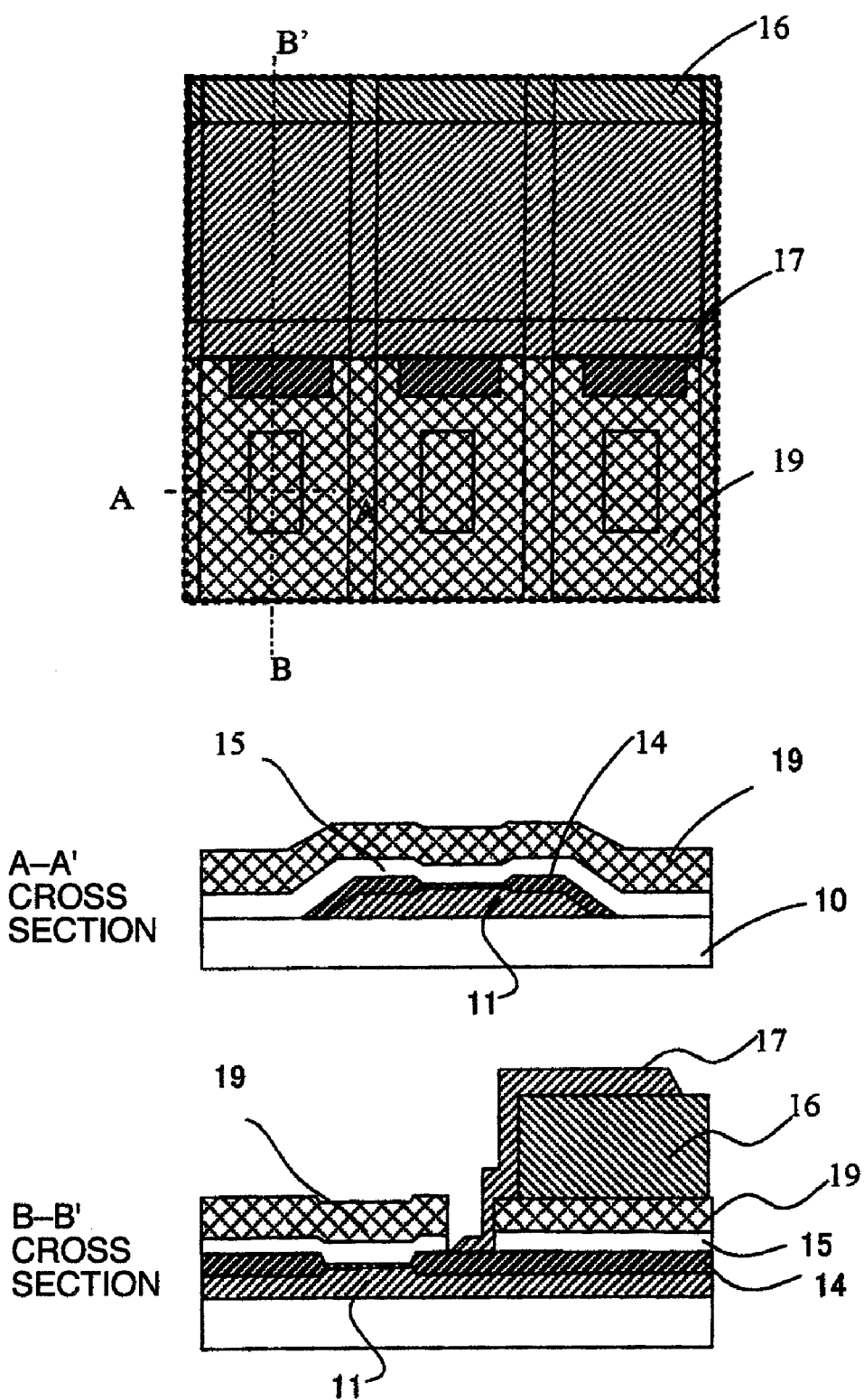
FIG. 11 is a view following FIG. 10, showing the method of manufacturing the thin film type electron source of the present invention.

Subsequently, an Al—Nd film serving as the contact part as a part of the scanning electrodes 16 is deposited by sputtering with a thickness of 600 nm (FIG. 10), and the Al—Nd film is processed by a photoetching process so as to be perpendicular to the lower electrode 11 and so that an end face on the electron emission part side may extend to a portion where the first interlayer film 15 and second interlayer film 19 are opened, and an end face on the opposite side may be positioned above the scanning electrode 16. For the etching, wet etching in a mixed aqueous solution of a phosphoric acid, an acetic acid, or a nitric acid is used, for example (FIG. 11).

Figure 12:
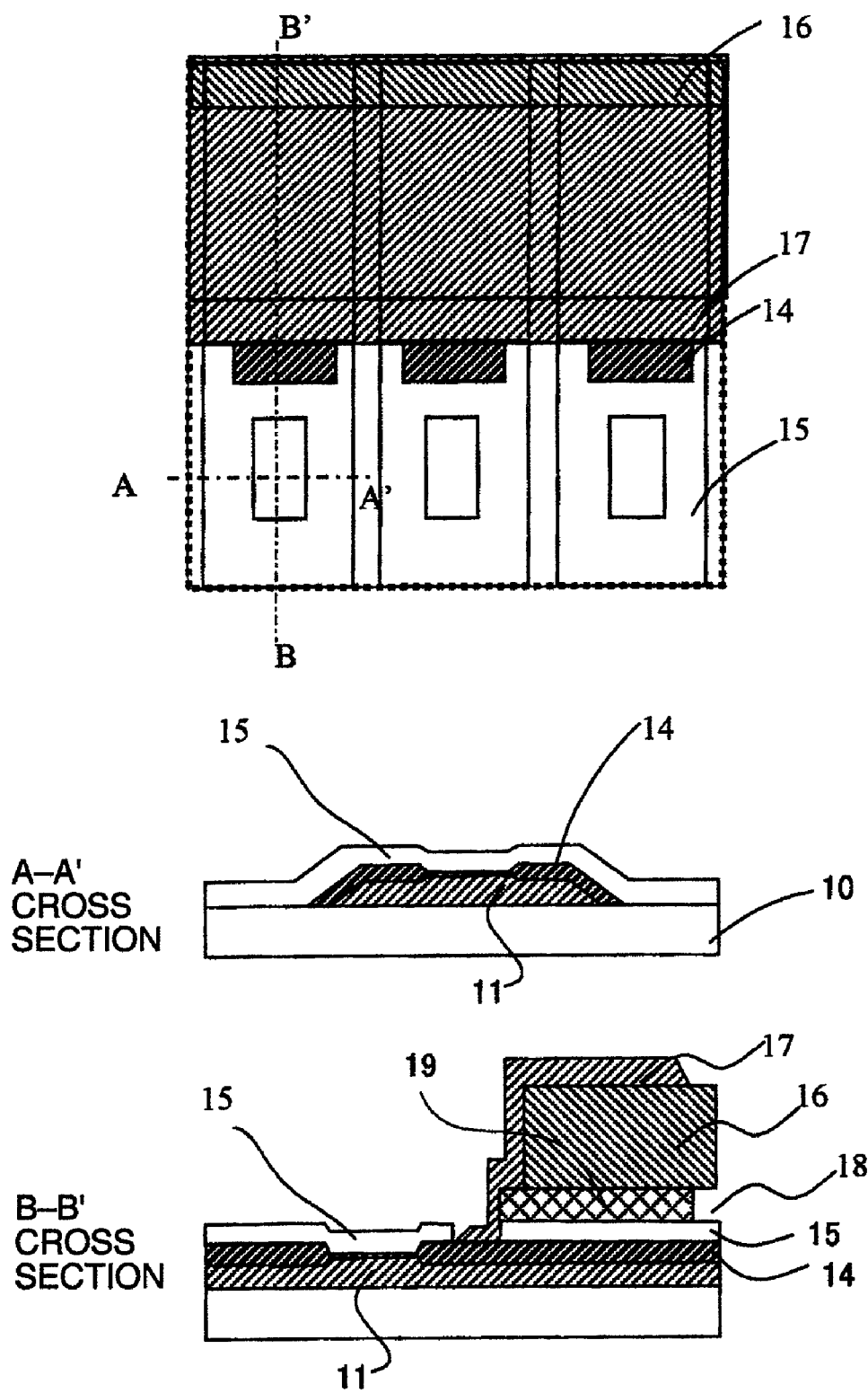
FIG. 12 is a view following FIG. 11, showing the method of manufacturing the thin film type electron source of the present invention.

Subsequently, Si of the second interlayer film 19 is etched with a high selection ratio with respect to SiN of the first interlayer film 15 by dry etching to form the step 18 under the end face on the opposite side of the electron emission part of the scanning electrode 16 (FIG. 12). The dry etching was carried out using a mixed gas of $CF_4$ and $O_2$ or a mixed gas of $SF_6$ and $O_2$ (dry etching process B). Although the both gases etch Si and SiN, the etching selectivity of Si can be increased by optimizing the proportion of $O_2$.

Figure 13:
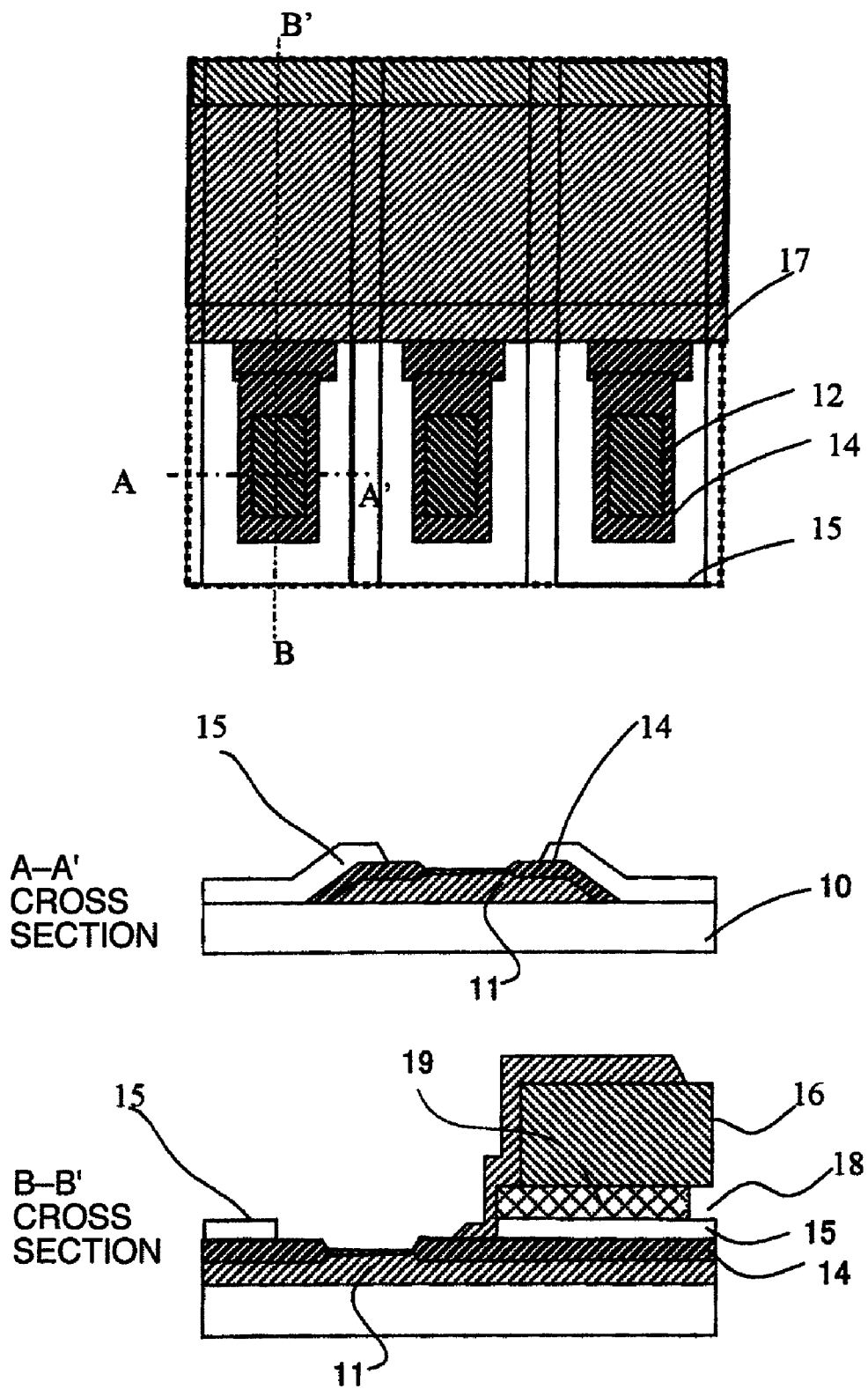
FIG. 13 is a view following FIG. 12, showing the method of manufacturing the thin film type electron source of the present invention.

Subsequently, with the use of photoresist, the first interlayer film 15 above the electron emission part is processed to open the electron emission part. This etching can be carried out by dry etching using an etchant mainly composed of $CF_4$ or $SF_6$, for example (dry etching process C) (FIG. 13).

Next, aqueous solutions of a mineral salt and organic salt of an alkali metal and alkaline earth metal are applied and dried. As the alkali metal, Cs, Rb, L, Na, and Li are effective. As the alkaline earth metal, Mg, Ca, Sr, Ba, and the like can be used. As the salt, phosphate, silicate, carbonate, hydrogencarbonate, nitrate, sulfate, acetate, borate, chloride, hydroxide, and the like are applicable.

Figure 14:
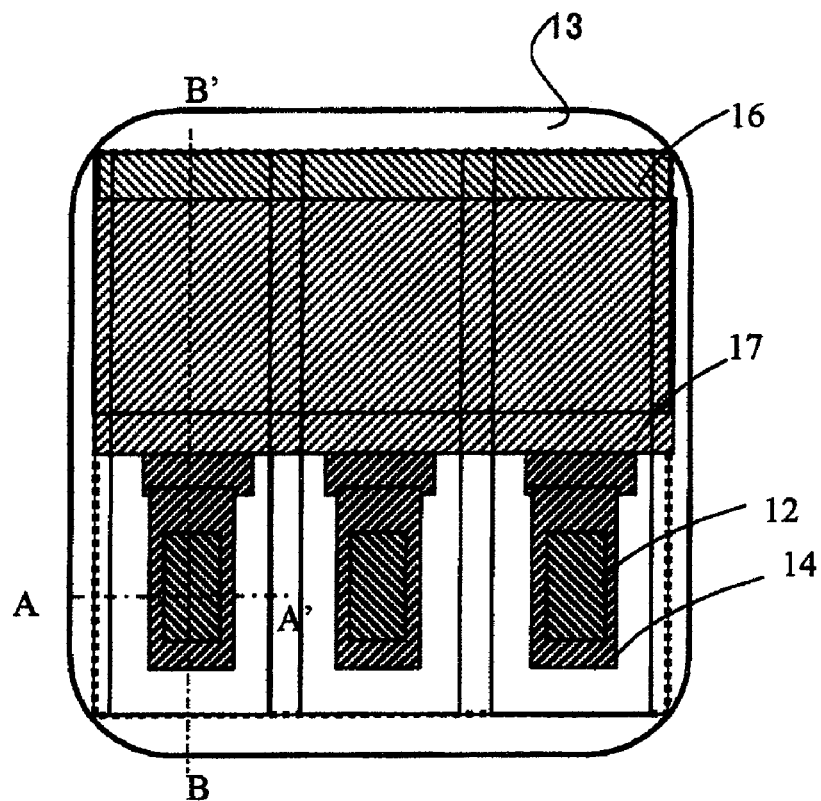
FIG. 14 is a view following FIG. 13, showing the method of manufacturing the thin film type electron source of the present invention.
Figure 14:
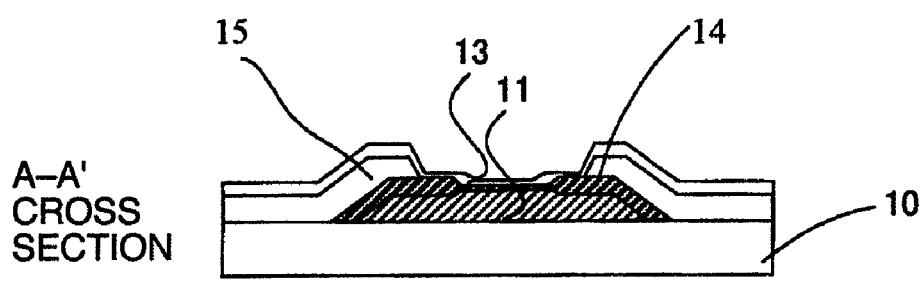
Figure 14:
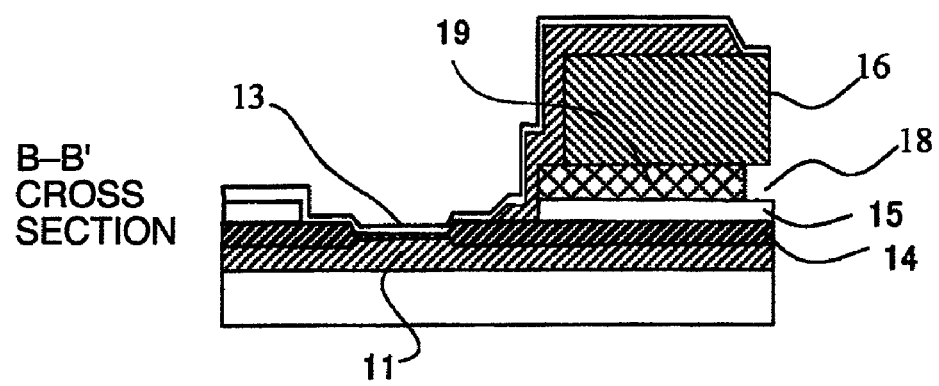

Next, the upper electrode 13 film is deposited. For this deposition method, sputtering deposition is used, for example. As the upper electrode 13, for example, a laminated film of Ir, Pt, and Au is used and the film thickness is set to 3 nm (FIG. 14).

Through the above-described processes, the electron source array can be prepared, wherein the step 18 for cutting the upper electrode 13 is provided on one side surface of the scanning electrode 16, and the contact part 17 for coupling the upper electrode 13 thereto is provided on another side surface of the scanning electrode 16. In addition, with regard to the two outside scanning electrodes, the step 18 is not provided but the contact part 17 is prepared on both sides by changing the resist pattern in the processes of FIG. 9, FIG. 11, and FIG. 12.

Furthermore, the cathode substrate and phosphor surface substrate constituting the image display device are calcined and sealed via the spacers and the frame member using a glass frit in a high temperature process at 350° C. to 450° C. In this case, the above-described mineral salt is oxidized and mixed into the upper electrode, and a part having an alloy phase with the upper electrode material is alloyed and doped with an alkali metal and a transition metal. For example, when processed with carbonate Cs, the carbonate decomposes and is oxidized into an oxidized Cs, and a part thereof will react with Au to form intermetallic compounds, such as AuCs and $Au_5Cs$. In this case, Ir and Pt of a platinum group may act as a catalyst in the decomposition of carbonate, helping stimulate the decomposition.

Hereinafter, formation processes of the thin film electron source of the image display device of the present invention will be specifically described in accordance with examples.

EXAMPLE 1

An image display device of Example 1 was prepared, wherein during manufacture of the above-described thin film electron source array, a $CF_4$ gas was used in Process A, Process B, and Process C of the above-described dry etching processes and a resist containing no S was used. The length of a diagonal line of the electron source array substrate was set to a nominal value of 17 inches. 2.5 μmol of K in terms of metal elements is added into the substrate by applying a carbonate K aqueous solution to the substrate and is dried before depositing the upper electrode, and then, as the upper electrode, 3.4 μmol of Ir, 10.5 μmol of Pt, and 9.4 μmol of Au in terms of metal elements are sequentially deposited.

EXAMPLE 2

A thin film electron source of an image display device using the same electron source array as that of Example 1 was prepared except that a resist containing S content was used.

EXAMPLE 3

A thin film electron source of an image display device was prepared by the same approach as that of Example 2 except that a $SF_6$ gas was used in Process A and Process B of the above-described dry etching processes. Furthermore, treatment of 440° C. times 1 h (hour) was carried our while circulating air within an image display panel of this image display device at 1 L (liter)/min.

EXAMPLE 4

The preparation was carried out by the same procedure except that 3% $H_2$—Ar in place of air is circulated at 1 L/min in Example 3.

Next, comparative examples for clarifying the effect of the present invention will be described.

COMPARATIVE EXAMPLE 1

Comparative Example 1 was prepared, wherein the heat treatment by air circulation was not carried out in Example 3.

COMPARATIVE EXAMPLE 2

30 L of 20 ppm $SO_2$—$N_2$ gas was circulated at 1 L/min within a panel of the image display device of Comparative Example 1.

COMPARATIVE EXAMPLE 3

60 L of 20 ppm $SO_2$—$N_2$ gas was circulated at 1 L/min within a panel of the image display device of Comparative Example 1.

COMPARATIVE EXAMPLE 4

90 L of 20 ppm $SO_2$—$N_2$ gas was circulated at 1 L/min within a panel of the image display device of Comparative Example 1.

Table 1 collectively describes Examples 1 to 4 and Comparative Examples 1 to 5.

TABLE 1

| | Dry etching | | | |
| | Process A | Process B | Used resist | Note |
| --- | --- | --- | --- | --- |
| Example 1 | $CF_4$ was used | $CF_4$ was used | Not containing S | |
| Example 2 | $CF_4$ was used | $CF_4$ was used | Containing S | |
| Example 3 | $SF_6$ was used | $SF_6$ was used | Containing S | Processed in air at 440° C. for 1 h |
| Example 4 | $SF_6$ was used | $SF_6$ was used | Containing S | Processed in 3% $H_2$—Ar at 440° C. for 1 h |
| Comparative Example 1 | $SF_6$ was used | $SF_6$ was used | Containing S | |
| Comparative Example 2 | $SF_6$ was used | $SF_6$ was used | Containing S | 30 L of 20 ppm $SO_2$—$N_2$ gas was circulated |

TABLE 1-continued

|  | Dry etching | | | |
| --- | --- | --- | --- | --- |
|  | Process A | Process B | Used resist | Note |
| Comparative Example 3 | SF$_6$ was used | SF$_6$ was used | Containing S | 60 L of 20 ppm SO$_2$—N$_2$ gas was circulated |
| Comparative Example 4 | SF$_6$ was used | SF$_6$ was used | Containing S | 90 L of 20 ppm SO$_2$—N$_2$ gas was circulated |

Next, in manufacturing the thin film electron source of the present invention, a manufacture test was conducted. Hereinafter, the results of evaluating, in this test, the thin film electron sources of the manufactured Examples and the thin film electron sources of new Examples will be described.

TEST EXAMPLE 1

From an electron source array part of an image display device, a substrate was cut out into a size of 1 cm×1 cm. An XPS (X-ray Photoelectron Spectroscopy) measurement was carried out to this substrate. An X ray with an energy of 1486.6 eV was irradiated to scan the existence range (157 eV to 177 eV) of peaks due to a 2 p orbital of S and the existence range (55 eV to 95 eV) of peaks due to a 4 f orbital of Ir, Pt, and Au. A sum of areas of all the peaks due to S and a sum of areas of all the peaks due to Ir, Pt, and Au were calculated, and then a mol ratio of the amount of S to the amount of Ir+Pt+Au in terms of metal elements was estimated by multiplying a sensitivity factor, respectively.

Furthermore, the work function of the surface of the upper electrode was evaluated by measuring a cut-off energy. Because −10 eV was offset in the measurement of the work function, the work function is calculated by Formula (1).

$$\text{Work function (eV)} = 1486.6 - (\text{cutoff energy} + 10) \quad (1)$$

Figure 15:
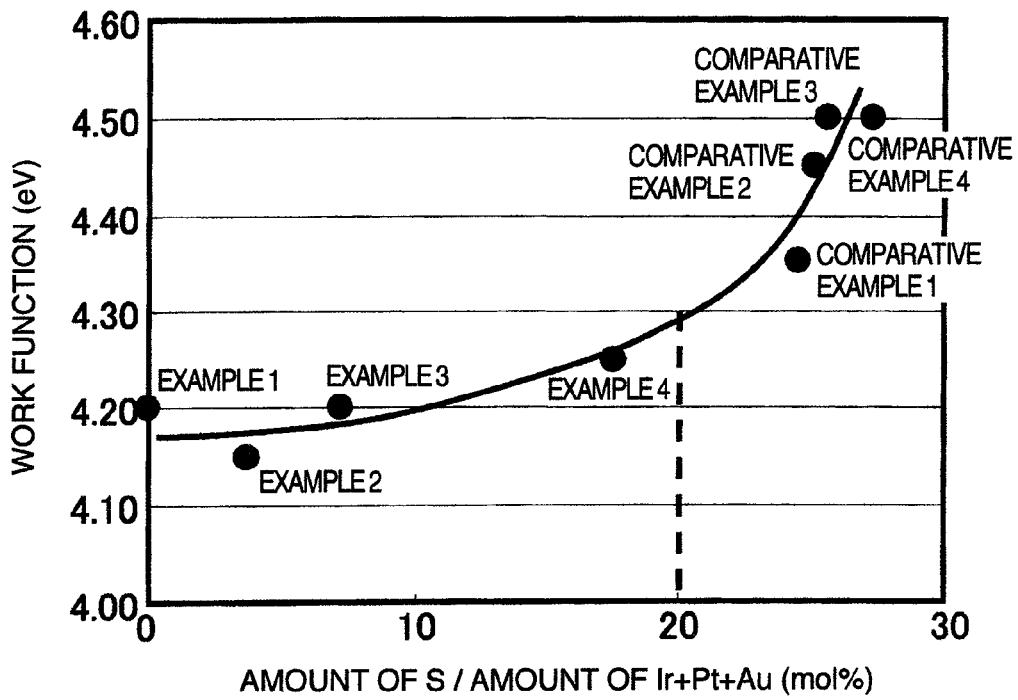
FIG. 15 is a view showing an effect on a work function of a mole ratio of the amount of S to the amount of Ir+Pt+Au.

The test, in which the mol ratio of the amount of S to the amount of Ir+Pt+Au and the work function are evaluated using the above-described method, is referred to as Test Example 1. FIG. 15 shows the results of evaluating Examples 1 to 4 and Comparative Examples 1 to 5 by Test Example 1. As shown in FIG. 15, it can be seen that when the amount of S to the amount of Ir+Pt+Au is equal to or less than 20 mol %, the work function is equal to or less than 4.30 eV, thus improving the electron emission characteristic of the electron source.

Example 5 of an image display device prepared by the same preparation method as that of Example 2 except that K was not added was prepared. In a similar manner, Examples, 6, 7, 8, and 9 of image display devices prepared by the same preparation approach as that of Example 2 except that Na, Cs, Sr, and Ba were added in place of K, respectively, were prepared.

Figure 16:
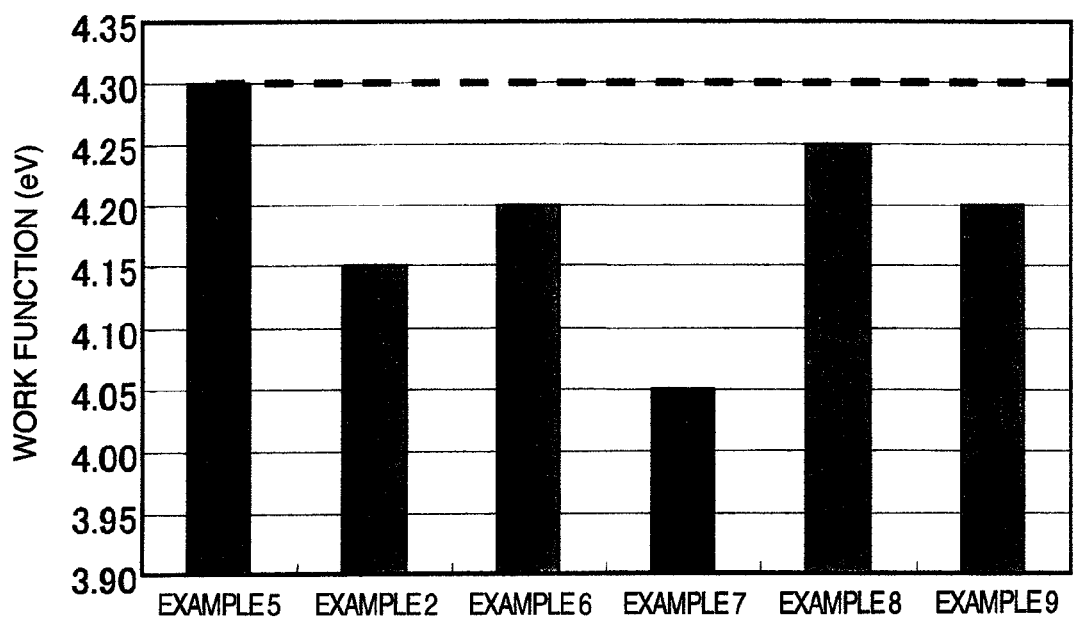
FIG. 16 is a view showing an effect on a work function of the addition of an alkali metal and an alkaline earth metal into an electron source.

FIG. 16 shows the results of evaluating Examples 5 to 9 by Test Example 1. The amount of S to the amount of Ir+Pt+Au in all the each example was 3 mol % to 5 mol % in terms of elements. As apparent from FIG. 16, even in Example 5 not containing an alkali metal and an alkaline earth metal, the work function is 4.30 eV, which is sufficiently low, however, in Examples 6 to 9, wherein an alkali metal or an alkaline earth metal is added, the work function is further lower than that of Example 5, which reveals that an addition of an alkali metal or an alkaline earth metal improves the electron emission characteristic of the electron source.

TEST EXAMPLE 2

A test is referred to as Test Example 2, in which the same evaluation as that of Test Example 1 was carried out except that the existence range (190 eV to 210 eV) of peaks due to 2 p orbital of Cl in place of peaks due to 2 p orbital of S was scanned and then a mol ratio of the amount of Cl to the amount of Ir+Pt+Au and the work function were evaluated.

Figure 17:
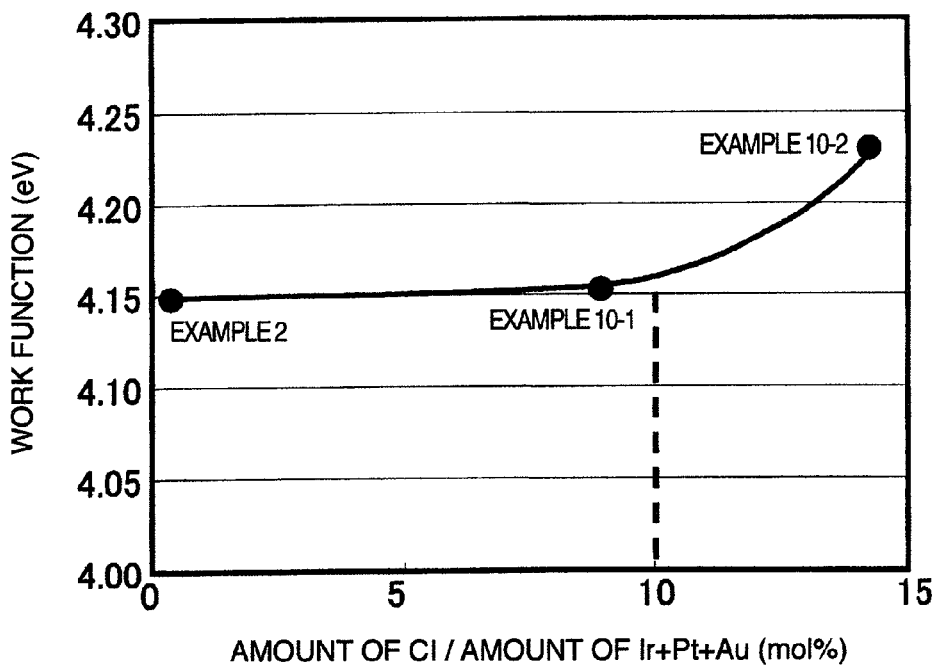
FIG. 17 is a view showing an effect on a work function of a mole ratio of the amount of Cl to the amount of Ir+Pt+Au.

20 L and 40 L of 5 ppm HCl—N$_2$ gas were circulated at 1 L/min within a panel of the image display device of Example 2, which are referred to as Example 10-1 and Example 10-2. The thin film electron source array parts of image display devices obtained in this way were evaluated by Test Example 2. FIG. 17 shows the results. As apparent from FIG. 17, as the mol ratio of the amount of Cl to the amount of Ir+Pt+Au exceeds 10 mol %, an abrupt increase in the work function will occur. Accordingly, if the amount of Cl to the amount of Ir+Pt+Au is equal to or less than 10 mol %, the work function can be kept low and the electron emission characteristic of the electron source can be maintained high.

TEST EXAMPLE 3

A test is referred to as Test Example 3, in which the same evaluation as that of Test Example 1 was carried out except that the existence range (675 eV to 695 eV) of peaks due to an is orbital of F in place of peaks due to a 2 p orbital of S was scanned and then a mol ratio of the amount of F to the amount of Ir+Pt+Au and the work function were evaluated.

Figure 18:
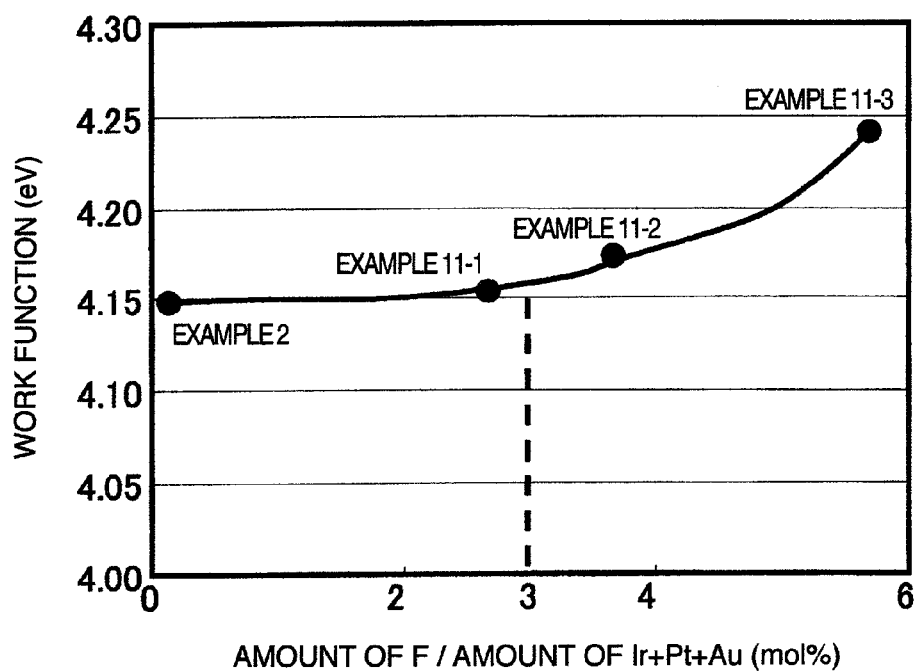
FIG. 18 is a view showing an effect on a work function of a mole ratio of the amount of F to the amount of Ir+Pt+Au.

Example 11-1, Example 11-2, and Example 11-3 of image display devices prepared by the same preparation method except that the dry etching time was extended in the dry etching processes A and B in preparing Example 2 were prepared. The electron source array parts of image display devices obtained in this way were evaluated using Test Example 3. FIG. 18 shows the results. As the dry etching time is extended, the residual amount of F content will increase. As apparent from FIG. 18, as the mol ratio of the amount of F to the amount of Ir+Pt+Au exceeds 3 mol %, an abrupt increase in the work function will occur. Accordingly, if the amount of F to the amount of Ir+Pt+Au is equal to or less than 30 mol %, the work function can be kept low and the electron emission characteristic of the electron source can be maintained high.

TEST EXAMPLE 4

A test is referred to as Test Example 4, in which the same evaluation as that of Test Example 1 was carried out except that the existence range (390 eV to 410 eV) of peaks due to an is orbital of N in place of peaks due to a 2 p orbital of S was scanned and then a mol ratio of a total amount of NH$_3$ and amines to the amount of Ir+Pt+Au and the work function were evaluated by multiplying a sensitivity coefficient to the area of peaks (in the vicinity of 401 eV) due to an N—C bond, and peaks (in the vicinity of 399 eV) due to —NH— and N=C bonds.

Figure 19:
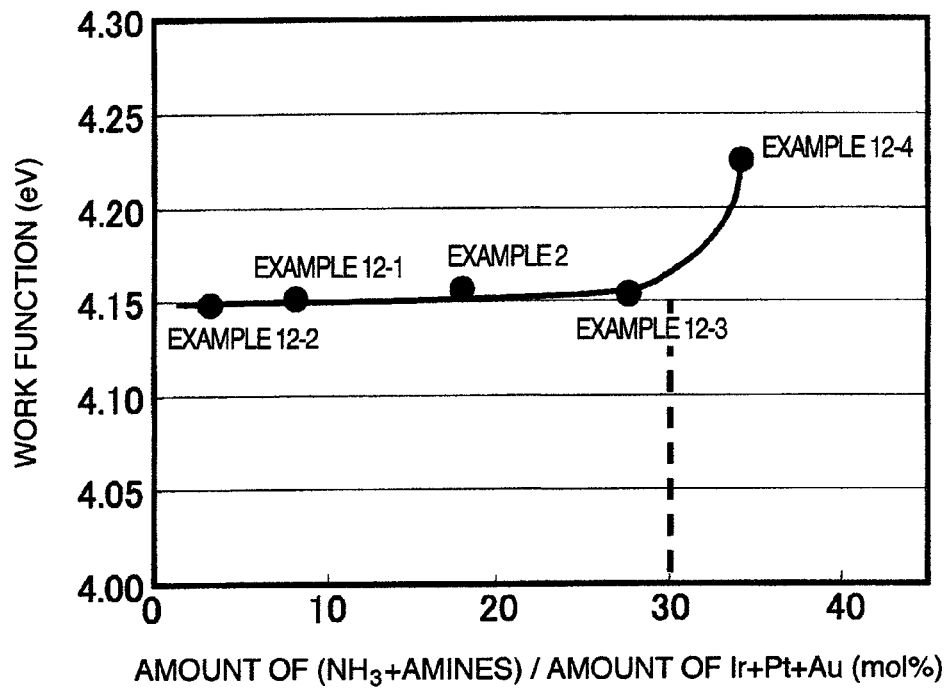
FIG. 19 is a view showing an effect on a work function of a mole ratio of the amount of $NH_3$+amines to the amount of Ir+Pt+Au.

The ones obtained by carrying out treatment at 440° C. for 30 min and for 1 h while circulating air at 1 L/min within a panel of the image display device of Example 2 are referred to as Example 12-1 and Example 12-2. On the other hand, 20 L and 40 L of 25 ppm $NH_3$—$N_2$ gas were circulated, respectively, within a panel of the image display device of Example 2, which are referred to as Example 12-3 and Example 12-4. The thin film electron source array parts of image display devices obtained in this way were evaluated by Test Example 4. FIG. 19 shows the evaluation result. As apparent from FIG. 19, as a mol ratio of a total amount of $NH_3$ and amines to the amount of Ir+Pt+Au exceeds 30 mol %, an increase in the work function will occur. Accordingly, if a total amount of $NH_3$ and amines to the amount of Ir+Pt+Au is equal to or less than 30 mol %, the work function can be kept low and the electron emission characteristic of the thin film electron source can be maintained high.

TEST EXAMPLE 5

A test is referred to as Test Example 5, in which the same evaluation as that of Test Example 1 was carried out except that the existence range (390 eV to 410 eV) of peaks due to an 1 s orbital of N in place of peaks due to a 2 p orbital of S was scanned and then a mol ratio of a total amount of NOx to the amount of Ir+Pt+Au and the work function were evaluated by multiplying a sensitivity coefficient to the area of peaks (in the vicinity of 402 eV) due to an N—O bond.

Example 13-1, Example 13-2, and Example 13-32 were prepared by circulating 20 L, 40 L, and 60 L of 25 ppm NO—N2 gas, respectively, at 1 L/min at room temperature within a panel of the image display device of Example 2.

Figure 20:
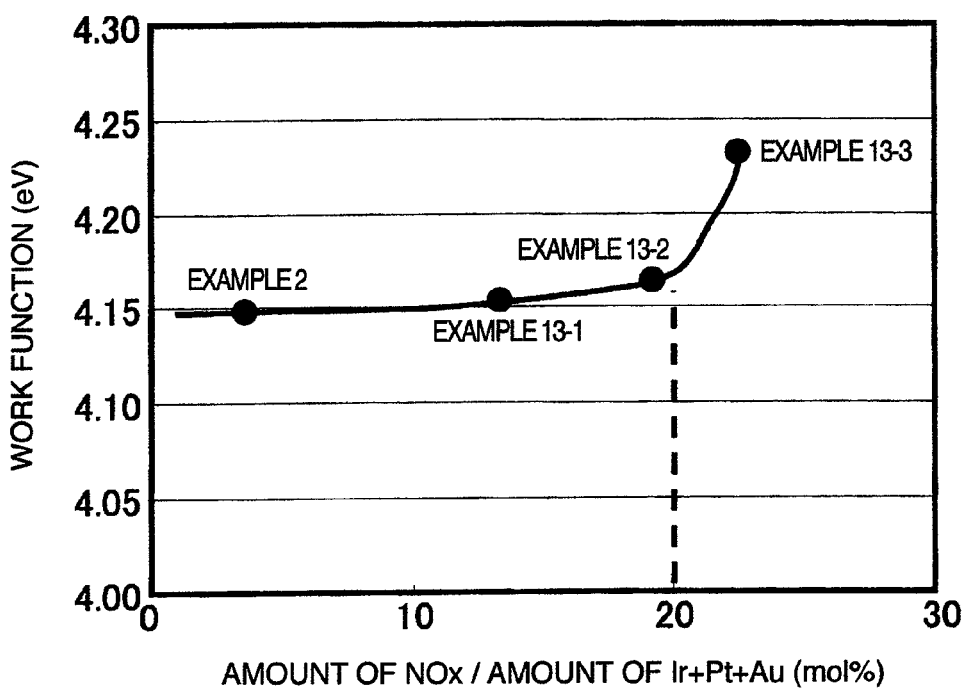
FIG. 20 is a view showing an effect on a work function of a mole ratio of the amount of NOx to the amount of Ir+Pt+Au.

The thin film electron source array parts of image display devices obtained in this way were evaluated by Test Example 5. FIG. 20 shows the evaluation result. As apparent from FIG. 20, as a mol ratio of a total amount of NOx to the amount of Ir+Pt+Au exceeds 20 mol %, an increase in the work function will occur. Accordingly, if the amount of NOx to the amount of Ir+Pt+Au is equal to or less than 20 mol %, the work function can be kept low and the electron emission characteristic of the electron source can be maintained high.

TEST EXAMPLE 6

From the thin film electron source array part of an image display device, a substrate was cut out into a size of 1 cm×1 cm. This substrate was put in a vacuum vessel, and the pressure inside the vessel was set equal to or less than $1.0×10^{-9}$ Torr, and subsequently the temperature of the substrate was raised from 50° C. to 600° C. in the vessel. At this time, a gas desorbing from the substrate was detected by a mass spectrometer and the amount of hydrocarbon adhering to the substrate surface was estimated. A test that evaluates the amount of hydrocarbon adhering to the substrate by the above-described method is referred to as Test Example 6.

Figure 21:
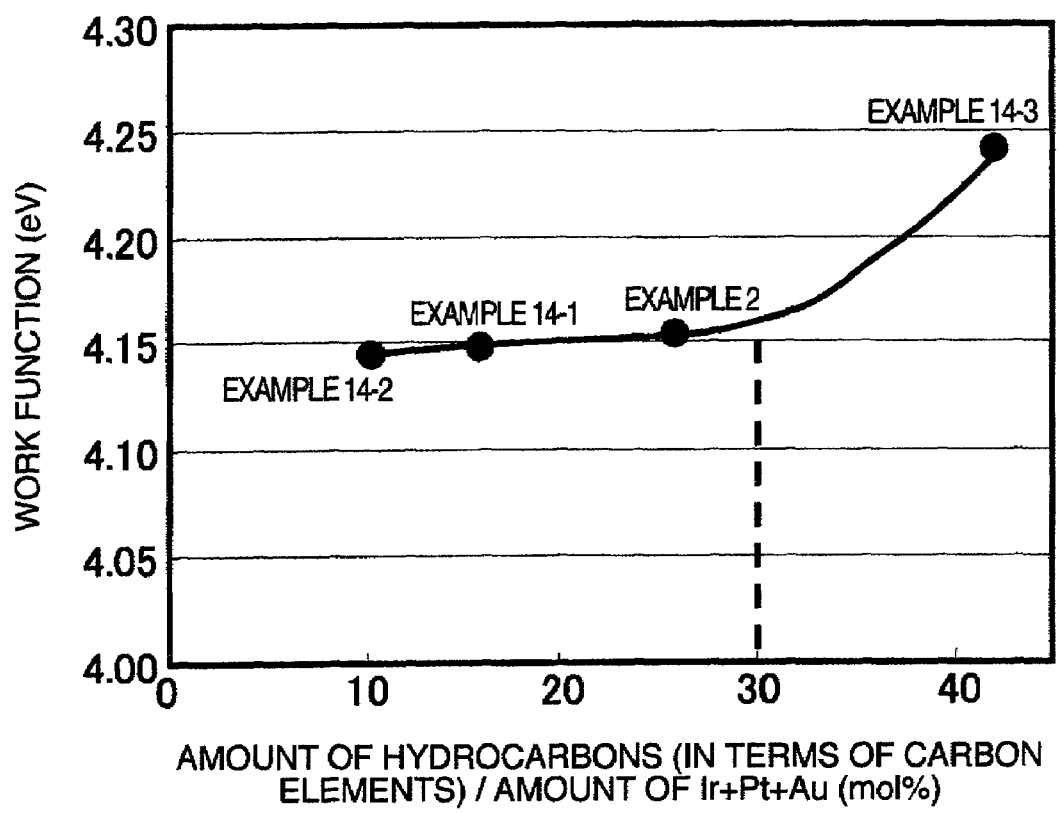
FIG. 21 is a view showing an effect on a work function of a mole ratio of the amount of hydrocarbon (in terms of carbon atoms) to the amount of Ir+Pt+Au.

Example 14-1 and Example 14-2 were prepared, in which treatments at 440° C. for 30 min and for 1 h were carried out while circulating air at 1 L/min within a panel of the image display device of Example 2. On the other hand, Example 14-3 was prepared by circulating 40 L of 25 ppm $C_3H_6$—$N_2$ gas within a panel of the image display device of Example 2. The thin film electron source array parts of image display devices obtained in this way were evaluated by Test Example 6. Moreover, the work function of each substrate was evaluated based on Test Example 1. FIG. 21 shows the evaluation result. As apparent from FIG. 21, as a mol ratio of the amount of hydrocarbon to the amount of Ir+Pt+Au exceeds 30 mol % in terms of carbon atoms, an increase in the work function will occur. Accordingly, if a total amount of hydrocarbon to the amount of Ir+Pt+Au is equal to or less than 30 mol % in terms of carbon atoms, the work function can be kept low and the electron emission characteristic of the electron source can be maintained high.

It should be further understood by those skilled in the art that although the foregoing description has been made on embodiments of the invention, the invention is not limited thereto and various changes and modifications may be made without departing from the spirit of the invention and the scope of the appended claims.

Advantages of the Invention

According to the present invention, an increase of the work function due to an adhesive material to the upper electrode can be suppressed, and by reducing degradation of the electron emission characteristic of the electron source, a high brightness image display can be obtained.

The invention claimed is:

1. An image display device comprising:
a plurality of thin film electron sources arranged in two dimensions; and
a phosphor surface comprising a plurality of colors of phosphors arranged corresponding to each of the thin film electron sources,
wherein the image display device displays an image by exciting the phosphor to emit light with electrons emitted from the thin film electron source,
wherein the thin film electron source array comprises a lower electrode, an upper electrode, and an electron acceleration layer sandwiched between the upper electrode and the lower electrode, and further comprises a plurality of thin film electron sources that emit electrons from the upper electrode,
wherein a formation material of the upper electrode comprises an element belonging to Group VIII or Group Ib of the periodic table or a laminated film or alloy film thereof, and
wherein in the upper electrode, an amount of S content adhering to a surface thereof is equal to or less than 20 mol % of a total amount of elements of the formation material of the upper electrode in terms of elements.

2. The image display device according to claim 1, wherein an amount of S content adhering to the surface of the upper electrode is equal to or less than 10 mol % of a total amount of elements of the formation material of the upper electrode in terms of elements.

3. The image display device according to claim 1, wherein an amount of S content adhering to the surface of the upper electrode is in a range from 0.1 mol % to 10 mol % of a total amount of elements of the formation material of the upper electrode in terms of elements.

4. The image display device according to claim 1, wherein an amount of Cl content adhering to the surface of the upper electrode is equal to or less than 10 mol % of a total amount of elements of the formation material of the upper electrode in terms of elements.

5. The image display device according to claim 1, wherein an amount of F content adhering to the surface of the upper electrode is equal to or less than 3 mol % of a total amount of elements of the formation material of the upper electrode in terms of elements.

6. The image display device according to claim 1, wherein a total amount of $NH_3$ and amines adhering to the surface of the upper electrode is equal to or less than 30 mol % of a total amount of elements of the formation material of the upper electrode in terms of nitrogen elements.

7. The image display device according to claim 1, wherein a total amount of NOx adhering to the surface of the upper electrode is equal to or less than 20 mol % of a total amount of elements of the formation material of the upper electrode.

8. The image display device according to claim 1, wherein a total amount of carbon and hydrocarbon adhering to the surface of the upper electrode is equal to or less than 30 mol % of a total amount of elements of the formation material of the upper electrode in terms of carbon elements.

9. The image display device according to claim 1, wherein the upper electrode contains an alkali metal or an alkali metal compound.

10. The image display device according to claim 1, wherein the upper electrode contains an alkaline earth metal or an alkaline earth metal compound.

11. A method of manufacturing an image display device, wherein the image display device comprises a plurality of thin film electron sources arranged in two dimensions, and a phosphor surface comprising a plurality of colors of phosphors arranged corresponding to each of the thin film electron sources, wherein the thin film electron source array comprises a lower electrode, an upper electrode, and an electron acceleration layer sandwiched between the upper electrode and the lower electrode, and further comprises a plurality of thin film electron sources that emit electrons from the upper electrode, the image display device displays an image by exciting the phosphor to emit light with electrons emitted from the thin film electron source, wherein a formation material of the upper electrode comprises an element belonging to Group VIII or Group Ib of the periodic table or a laminated film or alloy film thereof, wherein the method comprises the steps of:

forming the upper electrode above the electron acceleration layer using the formation material of the upper electrode; and keeping the thin film electron source in a range from 200° C. to a melting temperature of the upper electrode while contacting one of an $H_2$ containing gas, air, and oxygen to the upper electrode, wherein an amount of S content adhering to a surface of the upper electrode is set equal to or less than 20 mol % of a total amount of elements of the formation material of the upper electrode in terms of elements.

* * * * *